US010931447B2

(12) United States Patent
Moriyama

(10) Patent No.: US 10,931,447 B2
(45) Date of Patent: Feb. 23, 2021

(54) DATA RECEIVING DEVICE, DATA TRANSMISSION SYSTEM, AND KEY GENERATING DEVICE

(71) Applicant: Renesas Electronics Corporation, Tokyo (JP)

(72) Inventor: Daisuke Moriyama, Tokyo (JP)

(73) Assignee: RENESAS ELECTRONICS CORPORATION, Tokyo (JP)

(*) Notice: Subject to any disclaimer, the term of this patent is extended or adjusted under 35 U.S.C. 154(b) by 272 days.

(21) Appl. No.: 16/032,954

(22) Filed: Jul. 11, 2018

(65) Prior Publication Data
US 2019/0068368 A1 Feb. 28, 2019

(30) Foreign Application Priority Data
Aug. 28, 2017 (JP) .................. 2017-163283

(51) Int. Cl.
*H04L 9/08* (2006.01)
*H04L 9/06* (2006.01)
(Continued)

(52) U.S. Cl.
CPC .......... *H04L 9/0869* (2013.01); *H04L 9/0643* (2013.01); *H04L 9/0656* (2013.01);
(Continued)

(58) Field of Classification Search
CPC ....... H04L 9/08; H04L 9/0863; H04L 9/0869; H04L 9/0866; H04L 9/32; H04L 9/3242;
(Continued)

(56) References Cited

U.S. PATENT DOCUMENTS 8,695,089 B2\* 4/2014 Liu ..................... H04L 63/1458
713/189
2005/0036616 A1 2/2005 Huang et al.
(Continued)

FOREIGN PATENT DOCUMENTS

JP 2016-181815 A 10/2016
WO WO 2017/010057 A1 1/2017

OTHER PUBLICATIONS

Yanchao Zhang, et al., "A secure incentive protocol for mobile ad hoc networks," Wireless Networks; The Journal of Mobile Communication, Computation and Information, Kluwer Academic Publications, DO, vol. 13, No. 5, May 8, 2006 pp. 569-582 XP019535179.
(Continued)

*Primary Examiner* — Kristine L Kincaid
*Assistant Examiner* — Shaqueal D Wade
(74) *Attorney, Agent, or Firm* — McDermott Will & Emery LLP

(57) ABSTRACT

A data receiving device includes: a receiving unit that receives data, a list of individual identifiers, and a MAC generated by the repeater device; a pseudo-random function processing unit that derives a secret key by performing arithmetic by a predetermined pseudo-random function; a MAC generating function processing unit that generates MAC by performing arithmetic by a predetermined MAC generating function; a pseudo-random function processing controller that performs control to generate recursively a secret key corresponding to the individual identifier of each communication device from the first hierarchy to the N-th hierarchy; a MAC generating function processing controller that performs control to generate recursively a MAC corresponding to each communication device from the N-th hierarchy to the first hierarchy; and a comparator that compares the received MAC with the generated MAC (Continued)

corresponding to the communication device of the first hierarchy.

13 Claims, 24 Drawing Sheets

(51) Int. Cl.
| | | |
|---|---|---|
| *H04L 29/06* | (2006.01) | |
| *H04L 9/14* | (2006.01) | |
| *H04L 9/32* | (2006.01) | |
| *H04W 12/10* | (2021.01) | |
| *H04L 29/08* | (2006.01) | |

(52) U.S. Cl.
CPC .......... *H04L 9/0847* (2013.01); *H04L 9/0866* (2013.01); *H04L 9/0894* (2013.01); *H04L 9/14* (2013.01); *H04L 9/3242* (2013.01); *H04L 63/0428* (2013.01); *H04W 12/1002* (2019.01); *H04L 67/12* (2013.01)

(58) Field of Classification Search
CPC ......... H04L 9/06; H04L 63/12; H04L 63/123; H04L 63/14
See application file for complete search history.

(56) References Cited

U.S. PATENT DOCUMENTS

2010/0042844 A1* 2/2010 Zou ...................... H04L 9/3247
713/176
2016/0352733 A1* 12/2016 Oxford ................ H04L 9/0866
2018/0183583 A1* 6/2018 Yoshida .................... H04L 9/30

OTHER PUBLICATIONS

European Search Report dated Jan. 22, 2019 for European Patent Application No. 18189651.5-1218.

* cited by examiner

DATA RECEIVING DEVICE, DATA TRANSMISSION SYSTEM, AND KEY GENERATING DEVICE

CROSS-REFERENCE TO RELATED APPLICATIONS

The disclosure of Japanese Patent Application No. 2017-163283 filed on Aug. 28, 2017 including the specification, drawings, and abstract is incorporated herein by reference in its entirety.

BACKGROUND

The present invention relates to a data receiving device, a data transmission system, and a key generating device.

In recent years, IoT (Internet of Things) technology has been attracting attention. In the IoT technology, it becomes important how data is transmitted. The multi-hop communication is known as a transmission method of data. With regard to this, Patent Literature 1 discloses a system in which a parent node and multiple child nodes exist and one of the child nodes transmits data to the parent node via other child nodes. Patent Literature 2 discloses technology in which a device of a data transmit source transmits data to a repeater device after appending authenticator to the data.

(Patent Literature 1) International Publication WO/2017/010057
(Patent Literature 2) Japanese Unexamined Patent Application Publication No. 2016-181815

SUMMARY

In the multi-hop communication, data is transmitted via a repeater device. Therefore, it is important to confirm whether the transmitted data is the right data, and in addition, to confirm whether the data is transmitted along the right path. Therefore, a new technique that can verify whether the transmitted data is not falsified and whether the data is transmitted along the right path is expected to be proposed.

The other issues and new features of the present invention will become clear from the description of the present specification and the accompanying drawings.

According to one embodiment, a data receiving device is comprised of: a receiving unit that receives, via a repeater device, data, a list of individual identifiers of a transmission source device and the repeater device, and a MAC generated by the repeater device; a pseudo-random function processing unit that derives a secret key by performing arithmetic with the use of a predetermined pseudo-random function; and a MAC generating function processing unit that generates a MAC by performing arithmetic with the use of a predetermined MAC generating function. The data receiving device is further comprised of: a pseudo-random function processing controller that controls the pseudo-random function processing unit to generate recursively a secret key corresponding to the individual identifier of each communication device from the first hierarchy to the N-th hierarchy; a MAC generating function processing controller that controls the MAC generating function processing unit to generate recursively a MAC corresponding to each communication device from the N-th hierarchy to the first hierarchy; and a comparator that compares the MAC received by the receiving unit with the MAC corresponding to the first hierarchy communication device generated by the MAC generating function processing unit.

According to the one embodiment, it is possible to verify whether the transmitted data is not falsified and whether the data is transmitted along the right path.

DETAILED DESCRIPTION

Figure 1:
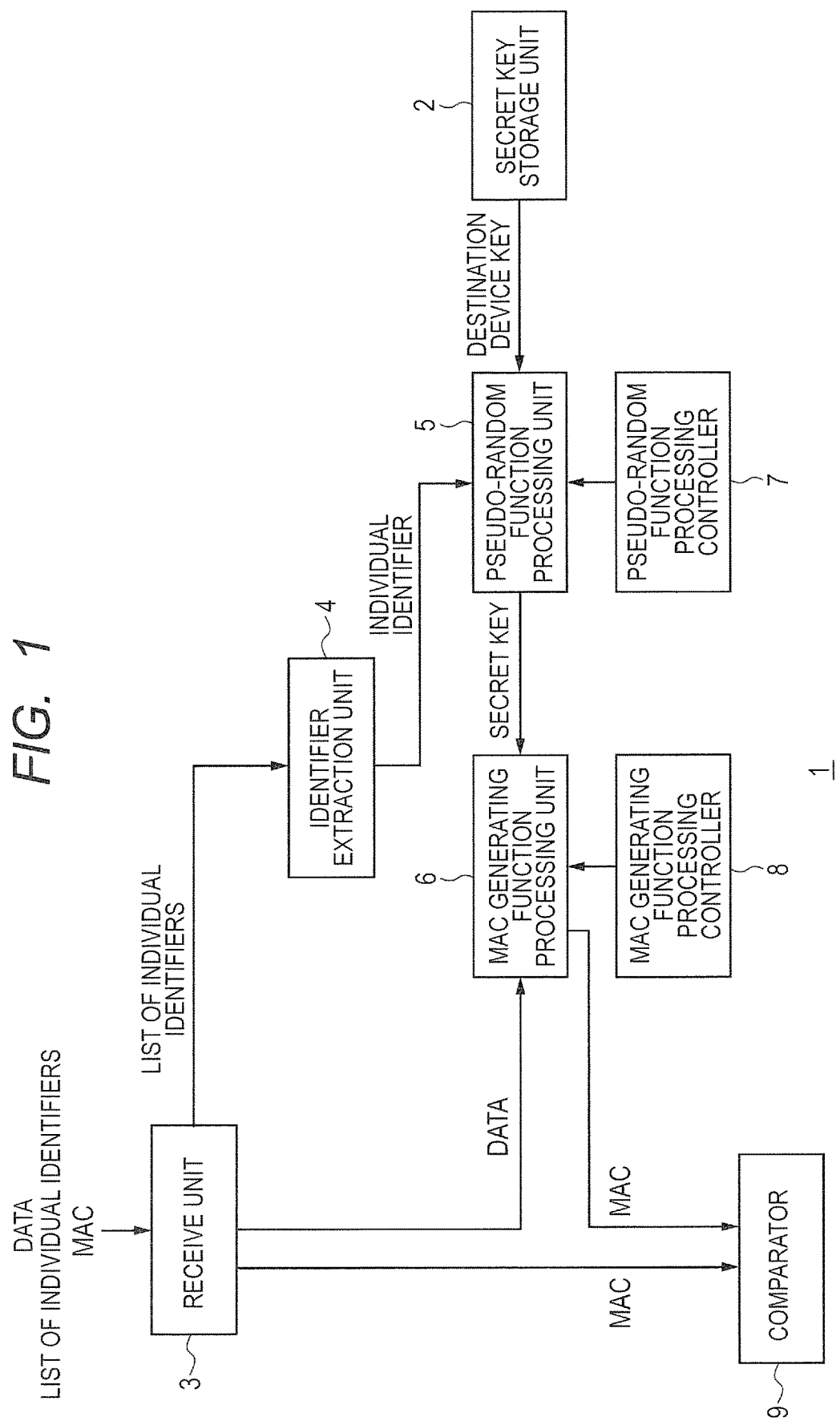
FIG. 1 is a block diagram illustrating an example of the configuration of a data receiving device according to the outline of Embodiment.

In the following descriptions and drawings, abbreviation and simplification are properly made in order to clarify explanation. In each drawing, the same symbol or reference numeral is attached to the same element and the repeated explanation thereof is omitted properly.

The Outline of Embodiment

First, the outline of Embodiment is explained prior to the detailed explanation of Embodiment. FIG. 1 is a block diagram illustrating an example of the configuration of a data receiving device 1 according to the outline of Embodiment. As illustrated in FIG. 1, the data receiving device 1 includes a secret key storage unit 2, a receiving unit 3, an identifier extraction unit 4, a pseudo-random function processing unit 5, a MAC generating function processing unit 6, a pseudo-random function processing controller 7, a MAC generating function processing controller 8, and a comparator 9. The data receiving device 1 is a communication device that receives data (also called a message) by using multi-hop communication in the network comprised of multiple communication devices. That is, this network includes a transmission source device as a communication device of a transmission source of data, a repeater device as a communication device to relay the transmission of data, and a data receiving device 1 as a communication device to receive data (a communication device of a transmission destination of data). The data receiving device 1 receives the data transmitted by the transmission source device, via the repeater device.

The secret key storage unit 2 stores a destination device key as a secret key determined in advance.

The receiving unit 3 receives information via the repeater device. Specifically, the receiving unit 3 receives data, a list of individual identifiers of the transmission source device and the repeater device, and a MAC (Message Authentication Code) generated by the repeater device. The individual identifier is assigned to the repeater device and the transmission source device in advance. The list of individual identifiers shows the individual identifiers of communication devices in a transmission path until the data reaches the data receiving device 1, in the order of the transmission path.

As described above, a repeater device exists in the transmission path from the transmission source device to the data receiving device 1. Therefore, when it is assumed that the data receiving device 1 is the communication device of the highest hierarchy and that the transmission source device is the communication device of the lowest hierarchy, the communication devices in the transmission path configure a hierarchy structure. Here, when the data receiving device 1 is assumed to be the communication device of the 0-th hierarchy, the communication device that transmits data to the data receiving device 1 directly can be called a communication device of the first hierarchy. Furthermore, when the data from the transmission source device reaches the data receiving device 1 through p repeater devices (p is a positive integer), this transmission source device can be called a communication device of the (p+1)-th hierarchy.

The identifier extraction unit 4 extracts an individual identifier of a communication device of each hierarchy in the transmission path of the data, from the list received by the receiving unit 3. The identifier extraction unit 4 may extract the individual identifier from the list by arbitrary methods. For example, the length (that is, bit length) of the individual identifier of the communication device of each hierarchy is determined in advance; accordingly, the identifier extraction unit 4 may extract each individual identifier from the list, based on the length determined in advance.

The pseudo-random function processing unit 5 derives a secret key by performing arithmetic with the use of a predetermined pseudo-random function. The derived secret key is used in the processing performed by the MAC generating function processing unit 6. The MAC generating function processing unit 6 generates a MAC by performing arithmetic with the use of a predetermined MAC generating function.

The pseudo-random function processing controller 7 controls the processing performed by the pseudo-random function processing unit 5. Specifically, the pseudo-random function processing controller 7 performs control to derive a secret key, by inputting into the pseudo-random function processing unit the destination device key and the extracted individual identifier of the first hierarchy communication device. The pseudo-random function processing controller 7 performs control to derive the secret key recursively, by inputting into the pseudo-random function processing unit 5 the derived secret key and the extracted individual identifier of the communication device of the k-th hierarchy (here, k is a positive integer between 2 and N inclusive, and N is the number of extracted individual identifiers). In this way, the pseudo-random function processing controller 7 performs control to generate the secret key corresponding to the individual identifier of each communication device from the first hierarchy to the N-th hierarchy.

The MAC generating function processing controller 8 controls the processing by the MAC generating function processing unit 6. Specifically, the MAC generating function processing controller 8 performs control to derive the MAC, by inputting into the MAC generating function processing unit the data received by the receiving unit 3 and the secret key corresponding to the extracted individual identifier of the N-th hierarchy communication device. The MAC generating function processing controller 8 performs control to derive the MAC recursively, by inputting into the MAC generating function processing unit 6 the derived MAC and the secret key corresponding to the extracted individual identifier of the m-th hierarchy communication device (here m is a positive integer between 1 and N−1 inclusive). In this way, the MAC generating function processing controller 8 performs control to generate a MAC corresponding to each communication device from the N-th hierarchy to the first hierarchy.

The comparator 9 compares the MAC received by the receiving unit 3 with the MAC corresponding to the first hierarchy communication device generated by the MAC generating function processing unit 6.

When the data receiving device 1 receives the falsified data, the proper data is not inputted to the MAC generating function processing unit 6. Therefore, the MAC received by the receiving unit 3 is different from the MAC corresponding to the first hierarchy communication device generated by the MAC generating function processing unit 6.

In addition, when the data receiving device 1 receives the falsified MAC, the proper MAC is not inputted to the MAC generating function processing unit 6. Therefore, the MAC received by the receiving unit 3 is different from the MAC corresponding to the first hierarchy communication device generated by the MAC generating function processing unit 6.

Furthermore, when the data receiving device 1 receives the falsified list of individual identifiers, the proper individual identifier is not inputted to the pseudo-random function processing unit 5. Accordingly, the proper secret key is not generated. Therefore, the proper secret key is not inputted to the MAC generating function processing unit 6. Therefore, the MAC received by the receiving unit 3 is different from the MAC corresponding to the first hierarchy communication device generated by the MAC generating function processing unit 6.

Therefore, when the comparator 9 determines that both MACs are in agreement, it means that the right data has been transmitted along the right path. When the comparator 9 determines that both MACs are not in agreement, it means that the data has been falsified or the data has not been transmitted along the right path. Therefore, according to the data receiving device 1, it is possible to verify whether the transmitted data is not falsified and whether the data is transmitted along the right path.

Embodiment 1

Figure 2:
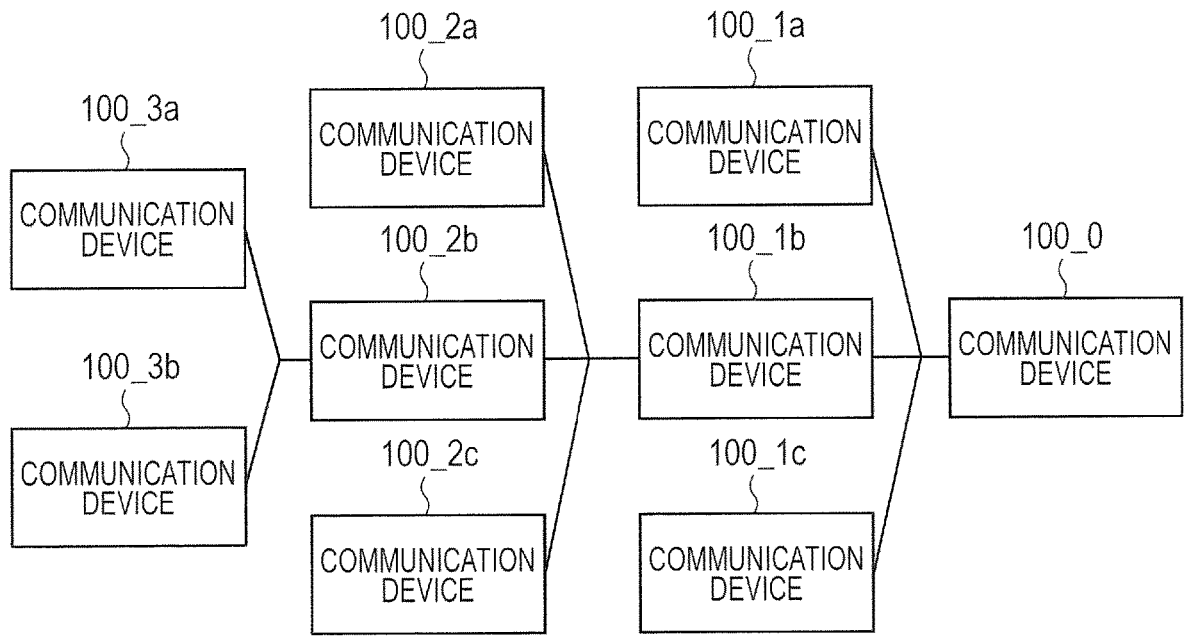
FIG. 2 is a schematic diagram illustrating an example of a network configuration of a data transmission system according to Embodiment.

Next, the details of Embodiment are explained. FIG. 2 is a schematic diagram illustrating an example of a network configuration of a data transmission system 10 according to Embodiment 1. The data transmission system 10 transmits data (also called a message) by using the multi-hop communication, in the network comprised of multiple communication devices.

In the data transmission system 10, the network is configured in the shape of a tree with a communication device 100_0 that finally receives the transmitted data as the highest-order node. In other words, in the data transmission system 10, the communication path is coupled in the shape of a tree. One or more communication devices are coupled communicatively to the communication device 100_0 as the highest-order node. In the example illustrated in FIG. 2, the communication device 100_0 is coupled communicatively to communication devices 100_1a, 100_1b, and 100_1c. The communication devices coupled communicatively to the communication device 100_0 are respectively coupled communicatively to none or one or more communication devices. In the example illustrated in FIG. 2, communication devices 100_2a, 100_2b, and 100_2c are coupled to the communication device 100_1b. In the network configuration of the data transmission system 10, it is possible to couple more communication devices in the same manner. In the example illustrated in FIG. 2, communication devices 100_3a and 100_3b are coupled to the communication device 100_2b. In the data transmission system 10, the communication devices may communicate mutually, by use of wireless communication or by use of wired communication.

In this way, in the data transmission system 10, the communication devices are coupled communicatively in a hierarchical fashion. In the example illustrated in FIG. 2, the communication device 100_0 as the highest-order node is coupled with the network of three hierarchies. However, the number of the hierarchy is an example and it is needless to say that Embodiment is not restricted to the present example. The number of the communication devices currently coupled to each communication device is also an example, and it is needless to say that Embodiment is not restricted to the present example.

In the following explanation, the communication device that is directly coupled communicatively to the communication device 100_0 as the highest-order node (that is, the communication devices 100_1a, 100_1b, and 100_1c in the example illustrated in FIG. 2) is called the communication device of the first hierarchy. The lower-order communication device that is directly coupled communicatively to the communication device of the first hierarchy (that is, the communication devices 100_2a, 100_2b, and 100_2c in the example illustrated in FIG. 2) is called the communication device of the second hierarchy. Similarly, the lower-order communication device directly coupled communicatively to the communication device of the (n−1)-th hierarchy is called the communication device of the n-th hierarchy. The communication devices that configure the data transmission system 10 may be called a communication device 100 collectively without distinction.

As described above, in the data transmission system 10, the data is transmitted by using the multi-hop communication. Therefore, the data transmission system 10 includes a transmission source device as a communication device of a transmission source of data, a repeater device as a communication device to relay the transmission of the data, and a data receiving device as a communication device to receive data (a communication device of the transmission destination of data). Then, the data receiving device receives the data transmitted by the transmission source device via the repeater device.

In the data transmission system 10 illustrated in FIG. 2, the communication devices 100_3a, 100_3b, 100_2a, 100_2c, 100_1a, and 100_1c, for example, are the transmission source devices. Also in the data transmission system 10 illustrated in FIG. 2, the communication devices 100_2b and 100_1b, for example, are the repeater devices. In the data transmission system 10 illustrated in FIG. 2, the communication device 100_0 is the data receiving device. That is, the communication device 100_0 corresponds to the data receiving device 1 described above.

The communication devices 100_0 as the data receiving device is a computer with a comparatively high computing power, such as a crowd and a server, for example. The communication devices as the repeater devices or the transmission source devices, other than the communication device 100_0, are electronic devices with a comparatively low computing power, such as a semiconductor device and an embedded device, for example.

In the data transmission system 10, a local ID is assigned to the communication device 100 as the transmission source device or the repeater device. Here, the local ID is the above-described individual identifier for identifying the communication device 100. The local ID (individual identifier) can specify uniquely the lower-order communication device 100 directly coupled to the same communication device 100. Therefore, the local ID (individual identifier) may not be an identifier that can specify uniquely the communication device 100 in the data transmission system 10. For example, local IDs mutually different are assigned to the communication devices 100_2a, 100_2b, and 100_2c as the immediately lower-order communication devices of the same communication device 100_1b. For example, the local ID of the communication device 100_2a and the local ID of the communication device 100_3a may be the same.

For example, the local ID may be an IP address of the communication device 100, may be a serial number of the communication device 100, or may be a production number of the communication device 100. In the present embodiment, the local ID is defined as a different value from a derivation key setting value to be described later. The derivation key setting value is 0, for example. Therefore, an integer greater than 0 for example is used for the local ID. The length of the local ID can be freely set up to each hierarchy. However, as described above, the maximum number of the lower-order nodes that are controlled by a certain communication device shall not exceed $2^A$, assuming that the number of bits of the local ID is A. In the present embodiment, the local ID is defined as a different value from the derivation key setting value. Therefore, in practice, the maximum number of the lower-order nodes that are controlled by a certain communication device will not exceed $2^A - 1$. In this way, an exponential number of communication devices are allowed to participate in the network, in contrast to the length of the local ID.

The communication device 100 to which a local ID (individual identifier) is assigned has a hierarchical identifier. The hierarchical identifier is uniquely associated with each communication device 100 to which the local ID (individual identifier) is assigned. The hierarchical identifier is comprised of the combination of the local ID (individual identifier) of the communication device 100 associated with the hierarchical identifier concerned and the local ID (individual identifier) of each communication device 100 in the predetermined data transmission path from the communication device 100 concerned. Specifically, the hierarchical identifier is comprised of these local IDs arranged corresponding to the order in the transmission path, for example. That is, the hierarchical identifier is comprised of the combination of the individual identifiers of the communication devices 100 in the predetermined data transmission path from a certain communication device 100 to the data receiving device. Hereinafter, the hierarchical identifier is called a hierarchical ID.

Here, the hierarchical ID is explained with a concrete example. When the local ID of the communication device 100_1b is ID1, the local ID of the communication device 100_2b is ID2, and the local ID of the communication device 100_3a is ID3, as illustrated in FIG. 2, the hierarchical ID of the communication device 100_3a is {ID1, ID2, ID3}, and the hierarchical ID of the communication device 100_2b is {ID1, ID2}. The hierarchical ID of the communication device 100_1b becomes the same as the local ID of the communication device 100_1b. In this way, the communication device 100 coupled to the communication device 100_0 by the network can be uniquely specified by the hierarchical ID.

Here, the configuration of communication device 100 is explained in detail.

Figure 3:
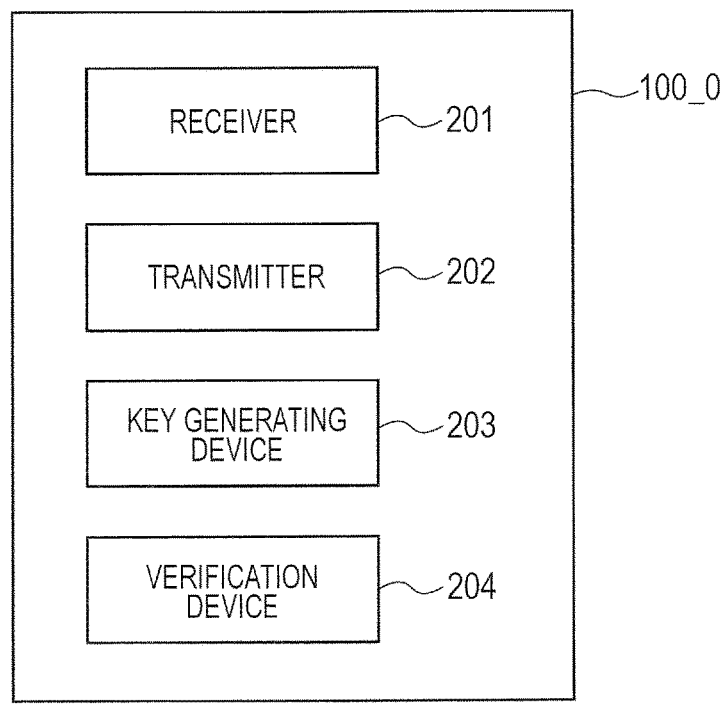
FIG. 3 is a block diagram illustrating an example of the configuration of a communication device as the data receiving device.

First, the configuration of the communication device 100 as the data receiving device (the communication device 100_0 in the example illustrated in FIG. 2) is explained. FIG. 3 is a block diagram illustrating an example of the configuration of the communication device 100 as the data receiving device. The communication device 100 as the data receiving device includes a receiver 201, a transmitter 202, a key generating device 203, and a verification device 204.

The receiver 201 corresponds to the receiving unit 3 described above, and is comprised of a receiving circuit that receives the information transmitted from other communication devices 100. The transmitter 202 is comprised of a transmitting circuit that transmits information to other communication devices 100. The receiver 201 and the transmitter 202 may be comprised of one transmitter/receiver. The receiver 201 may be called a receiving unit and the transmitter 202 may be called a transmitting unit.

The receiver 201 receives the data as a transmission target, the list of the local IDs of the transmission source device and the repeater device, and a MAC generated by the repeater device, via the repeater device. Here, the list indicates the repeating path, and when the transmission is performed in the right repeating path, the list agrees with the hierarchical ID of the transmission source device. The transmitter 202 transmits a secret key generated by the key generating device 203.

The key generating device 203 generates a secret key to be assigned to the transmission source device and the repeater device. The key generating device 203 generates the secret key based on a hierarchical ID, for the communication device 100 of the transmission source device and the communication device 100 of the repeater device. The transmitter 202 transmits the generated secret key to the communication device 100 of the transmission source device and to the communication device 100 of the repeater device. When the data receiving device has the information on a hierarchical ID of each of the transmission source device and the repeater device, the data receiving device generates the secret key for each communication device 100 using each hierarchical ID. For example, when the data receiving device determines the local ID of each communication device 100, the data receiving device knows the hierarchical ID of each communication device 100. As opposed to this, in cases where the repeater device determines the local ID for a lower-order communication device 100 added to the network for example, when the hierarchical ID of the lower-order communication device 100 is notified to the data receiving device, the data receiving device generates the secret key for the lower-order communication device 100 concerned. The communication in the transmit and/or receive of the secret key shall be performed in the environment where falsification and tapping are not performed.

The verification device 204 verifies the message transmitted to the communication device 100 as the data receiving device. When the receiver 201 receives the message, the MAC, and the list of the local ID (corresponding to the hierarchical ID of the transmission source device) from the repeater device, the verification device 204 verifies whether the message is valid and whether the message has been transmitted via the right repeater device. The details of the key generating device 203 and the verification device 204 will be described later.

Figure 4:
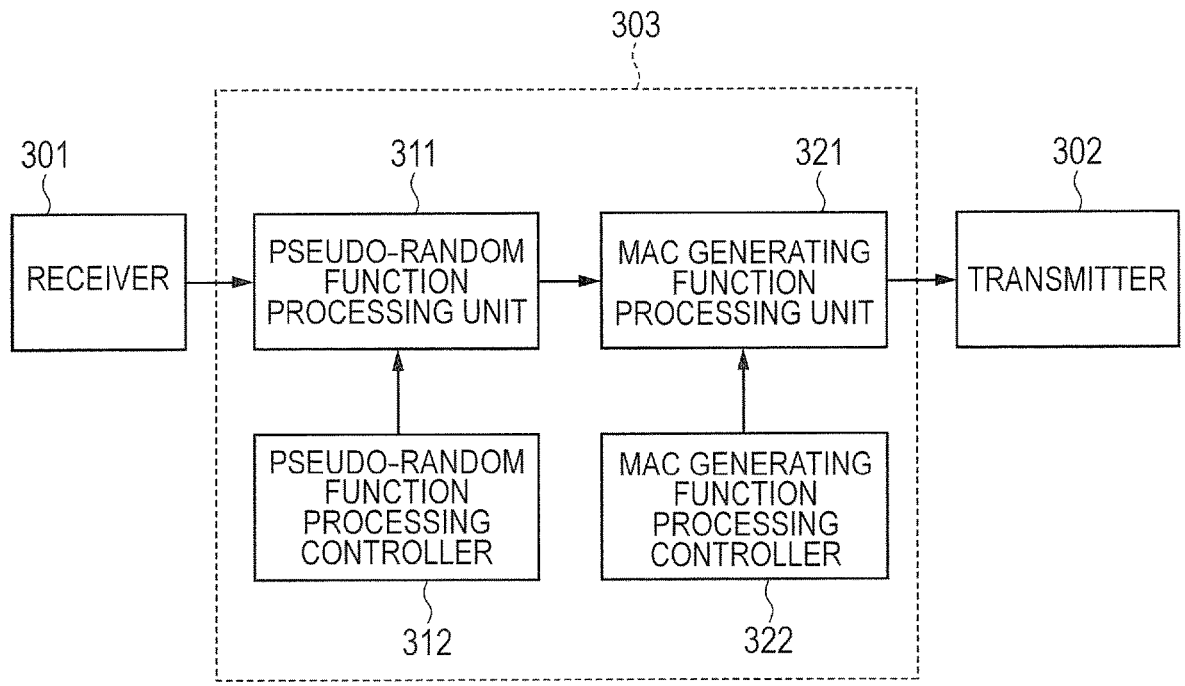
FIG. 4 is a block diagram illustrating an example of the configuration of a communication device as a transmission source device.

Next, the configuration of the communication device 100 as the transmission source device is explained (in the example illustrated in FIG. 2, the communication devices 100_3*a*, 100_3*b*, 100_2*a*, 100_2*c*, 100_1*a*, and 100_1*c*). FIG. 4 is a block diagram illustrating an example of the configuration of the communication device 100 as the transmission source device. The communication device 100 as the transmission source device includes a receiver 301, a transmitter 302, and an authentication generating device 303.

The receiver 301 is comprised of a receiving circuit that receives the information transmitted from other communication devices 100. The transmitter 302 is comprised of a transmitting circuit that transmits the information to other communication devices 100. The receiver 301 and the transmitter 302 may be comprised of one transmitter/receiver. The receiver 301 may be called a receiving unit and the transmitter 302 may be called a transmitting unit.

The authentication generating device 303 generates the authentication on a message, and specifically, it generates a MAC. The authentication generating device 303 includes a pseudo-random function processing unit 311, a pseudo-random function processing controller 312, a MAC generating function processing unit 321, and a MAC generating function processing controller 322. The authentication generating device 303 generates a secret key (hereinafter called a derivation key) derived from the secret key concerned by the pseudo-random function processing unit 311 using the secret key generated by the data receiving device. Then, using the derivation key, the authentication generating device 303 calculates a MAC on the message that is data as a transmission target, by the MAC generating function processing unit 321.

The pseudo-random function processing unit 311 derives a secret key (derivation key) by performing arithmetic with the use of a predetermined pseudo-random function. The predetermined pseudo-random function inputs the secret key and a value of arbitrary length, and outputs a value of arbitrary length that is not discriminable from a random number from the viewpoint of cryptography. In the pseudo-random function, when the same message is inputted with the predetermined secret key, the output of the function becomes always the same. Any one of a key derivation function that is based on the common key encryption or the Hash function and a key derivation function that utilizes the exponentiation arithmetic with the proven safety may be used as the pseudo-random function. Also in a pseudo-random function processing unit 411 and a pseudo-random function processing unit 211 to be described later, the same pseudo-random function as used in the pseudo-random function processing unit 311 is used.

The pseudo-random function processing controller 312 performs control to generate a secret key unique to the transmission source device concerned, by inputting into the pseudo-random function processing unit 311 the secret key assigned to the transmission source device concerned and the derivation key setting value. The derivation key setting value is a predetermined value and is 0 for example. Also in a pseudo-random function processing unit 411 to be described later, the same derivation key setting value as used in the pseudo-random function processing unit 311 is used. Also in the pseudo-random function processing unit 211 to be described later, when the derivation key setting value is inputted, the same derivation key setting value as used in the pseudo-random function processing unit 311 is used. In the present embodiment, the secret key inputted into the pseudo-random function processing unit 311 is a secret key generated by the pseudo-random function processing unit 211 (to be described later) of the key generating device 203 of the data receiving device. The receiver 301 receives the secret key generated by the key generating device 203, and the pseudo-random function processing unit 311 generates a derivation key using this received secret key.

The MAC generating function processing unit 321 generates a MAC by performing arithmetic with the use of a predetermined MAC generating function. The predetermined MAC generating function generates a MAC (Message Authentication Code) utilizing the common key encryption or the Hash function. Any method such as the CMAC (Cipher-based MAC) based on the common key encryption and the HMAC (Hash-based MAC) based on the Hash function may be used as the MAC generating function as long as the safety thereof is proven. Also in a MAC generating function processing unit 421 and a MAC generating function processing unit 221, to be described later, the same pseudo-random function as used in the MAC generating function processing unit 321 is used.

The MAC generating function processing controller 322 performs control to generate a MAC on data by inputting into the MAC generating function processing unit 321 the data (message) as the transmission target and the secret key unique to the transmission source device concerned. In the present embodiment, the MAC generating function processing controller 322 inputs into the MAC generating function processing unit 321 the secret key (derivation key) generated by the pseudo-random function processing unit 311 as the secret key unique to the transmission source device concerned. Since the data as the transmission target is inputted into the MAC generating function processing unit 321, the message having a value of arbitrary length is inputted.

The transmitter 302 transmits the message as the data of the transmission target, the MAC generated by the MAC generating function processing unit 321, and the local ID of the transmission source device concerned, to the repeater device as the higher-order node of the transmission source device concerned.

Figure 5:
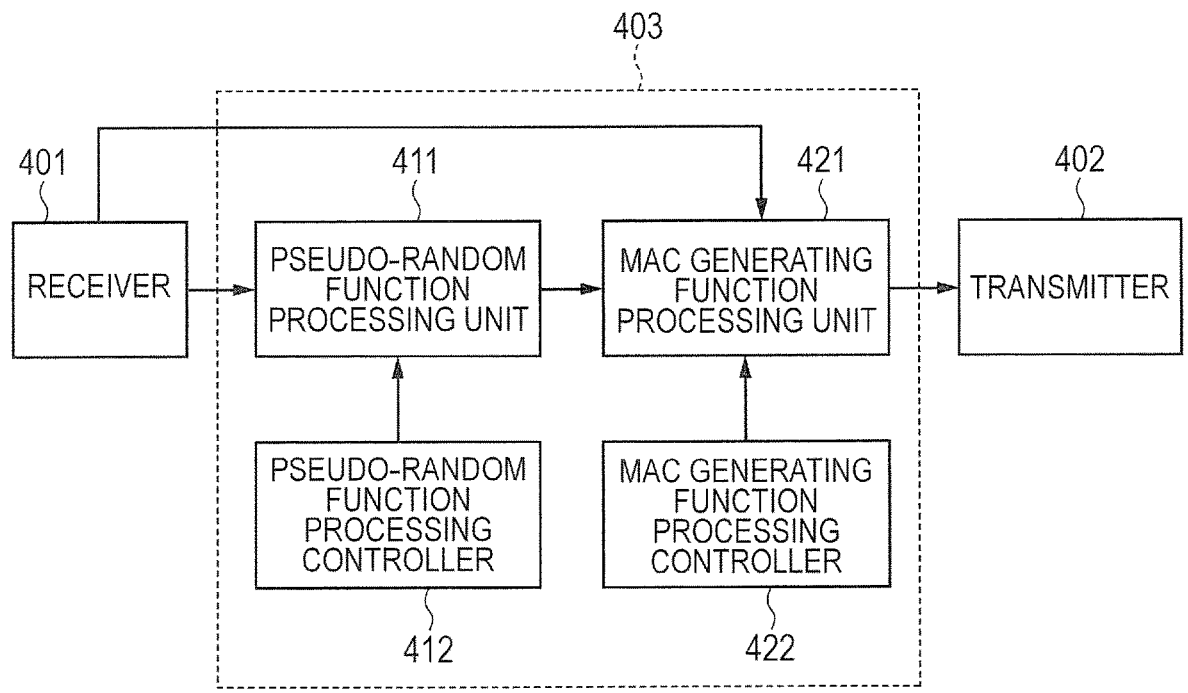
FIG. 5 is a block diagram illustrating an example of the configuration of a communication device as a repeater device.

Next, the configuration of the communication device 100 as the repeater device is explained (the communication devices 100_2*b* and 100_1*b* in the example illustrated in FIG. 2). FIG. 5 is a block diagram illustrating an example of the configuration of the communication device 100 as a repeater device. The communication device 100 as the repeater device includes a receiver 401, a transmitter 402, and an authentication generating device 403.

The receiver 401 is comprised of a receiving circuit that receives the information transmitted from other communication devices 100. The transmitter 402 is comprised of a transmitting circuit that transmits the information to other communication devices 100. The receiver 401 and the transmitter 402 may be comprised of one transmitter/receiver. The receiver 401 may be called a receiving unit and the transmitter 402 may be called a transmitting unit.

When the transmission of data is relayed, the receiver 401 receives the data as the transmission target, the MAC, and the individual identifier of the communication device 100.

As is the case with the authentication generating device 303, the authentication generating device 403 generates the authentication on a message, and specifically, it generates a MAC. The authentication generating device 403 includes a pseudo-random function processing unit 411, a pseudo-random function processing controller 412, a MAC generating function processing unit 421, and a MAC generating function processing controller 422. The authentication generating device 403 generates a derivation key from the secret key concerned by the pseudo-random function processing unit 411 using the secret key generated by the data receiving device. Then, using the derivation key, the authentication generating device 403 calculates a MAC on the MAC received by the receiver 401 by the MAC generating function processing unit 421.

As is the case with the pseudo-random function processing unit 311, the pseudo-random function processing unit 411 derives a secret key (derivation key) by performing arithmetic with the use of a predetermined pseudo-random function. The pseudo-random function processing controller 412 performs control to generate a secret key unique to the repeater device concerned, by inputting into the pseudo-random function processing unit 411 the secret key assigned to the repeater device concerned and the derivation key setting value. In the present embodiment, the secret key inputted into the pseudo-random function processing unit 411 is a secret key generated by the pseudo-random function processing unit 211 (to be described later) of the key generating device 203 of the data receiving device.

As is the case with the MAC generating function processing unit 321, the MAC generating function processing unit 421 generates a MAC by performing arithmetic with the use of a predetermined MAC generating function. The MAC generating function processing controller 422 performs control to generate a MAC on the MAC received by the receiver 401, by inputting into the MAC generating function processing unit 421 the MAC received by the receiver 401 and the secret key unique to the repeater device concerned. In the present embodiment, the MAC generating function processing controller 422 inputs into the MAC generating function processing unit 421 the secret key generated by the pseudo-random function processing unit 411. The MAC received by the receiver 401 is inputted into the MAC generating function processing unit 421 as a message. Therefore, the bit length of the value inputted into the MAC generating function processing unit 421 as the message becomes the bit length of the MAC to be calculated.

The transmitter 402 transmits the message as the data of the transmission target, the MAC generated by the MAC generating function processing unit 421, the local ID of the repeater device concerned, and the local ID received by the receiver 401, to the communication device as the higher-order node (that is, the other repeater device or the data receiving device). When the communication device 100 that has transmitted directly the message to the repeater device concerned is a repeater device, the receiver 401 of the repeater device concerned receives multiple local IDs about the communication devices 100 from transmission source device to the repeater device concerned. Therefore, in such a case, the transmitter 402 transmits a group of the received multiple local IDs with the local ID of the repeater device concerned to the communication device as the higher-order node.

Figure 6:
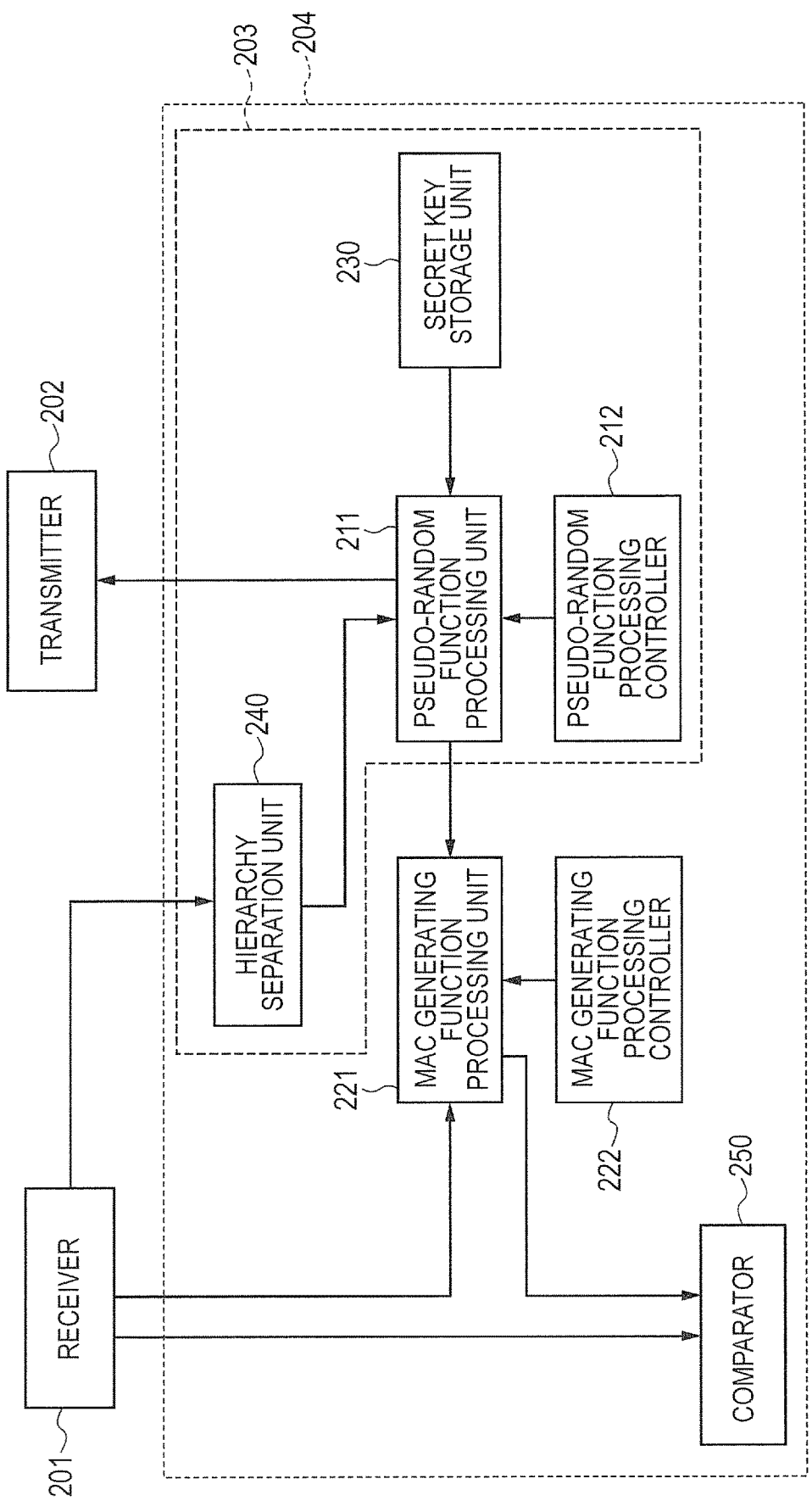
FIG. 6 is a block diagram illustrating an example of the detailed configuration of the communication device as the data receiving device.

Next, the details of the key generating device 203 and the verification device 204 of the data receiving device are explained. FIG. 6 is a block diagram illustrating an example of the detailed configuration of the communication device 100 as the data receiving device. As illustrated in FIG. 6, as the configuration of the verification device 204, the communication device 100 as the data receiving device includes a secret key storage unit 230, a hierarchy separation unit 240, a pseudo-random function processing unit 211, a pseudo-random function processing controller 212, a MAC generating function processing unit 221, a MAC generating function processing controller 222, and a comparator 250. Here, the key generating device 203 is comprised of the secret key storage unit 230, the hierarchy separation unit 240, the pseudo-random function processing unit 211, and the pseudo-random function processing controller 212.

The secret key storage unit 230 corresponds to the secret key storage unit 2 described above, and stores a destination device key as a predetermined secret key determined in advance. The secret key storage unit 230 is realized by an arbitrary safe memory device, such as a secure storage. The destination device key is a secret key that the data receiving device has. The secret key assigned to the transmission source device and the repeater device is generated based on the destination device key.

The hierarchy separation unit 240 operates as follows. When the secret key for distributing to the transmission source device and the repeater device is generated, that is, when the hierarchy separation unit 240 functions as a part of the key generating device 203, the hierarchy separation unit 240 extracts a local ID of the communication device 100 of each hierarchy in the transmission path from the hierarchical ID of the communication device 100 as a distribution target of the secret key. For example, when the distribution target of the secret key is the communication device 100_3a illustrated in FIG. 2, the hierarchy separation unit 240 extracts ID3, ID2, and ID1 from the hierarchical ID of the communication device 100_3a. In this way, when the communication device 100 as the distribution target of the secret key is the communication device of the N-th hierarchy in the network, the hierarchy separation unit 240 extracts N local IDs from the communication device 100 of the first hierarchy to the communication device 100 of the N-th hierarchy.

The hierarchy separation unit 240 also extracts a local ID as follows. When the transmission of data from the transmission source device is performed, that is, when the hierarchy separation unit 240 functions as a part of the verification device 204, the hierarchy separation unit 240 extracts the local ID of the communication device 100 of each hierarchy in the transmission path of the data from the list of the local IDs received by the receiver 201. As described above, when the transmission source device and the repeater device transmit data to the higher-order communication device, the local ID of the own equipment is added to the information as the transmission target. Therefore, the receiver 201 of the data receiving device receives the list of the local IDs of each communication device 100 in the transmission path (that is, the communication device 100 of each hierarchy from the transmission source device to the data receiving device). The hierarchy separation unit 240 separates and extracts the local ID of each hierarchy from the received list. The hierarchy separation unit 240 separates the received list corresponding to the length of the local ID for every hierarchy, and extracts each local ID. In this way, when the list of N local IDs is received, the hierarchy separation unit 240 extracts N local IDs from the communication device 100 of the first hierarchy to the communication device 100 of the N-th hierarchy.

The hierarchy separation unit 240 corresponds to the identifier extraction unit 4 described above.

As is the case with the pseudo-random function processing unit 311, the pseudo-random function processing unit 211 derives a secret key by performing arithmetic with the use of a predetermined pseudo-random function. The processing of the pseudo-random function processing unit 211 is controlled by the pseudo-random function processing controller 212. The pseudo-random function processing unit 211 corresponds to the pseudo-random function processing unit 5 described above. The pseudo-random function processing controller 212 corresponds to the pseudo-random function processing controller 7 described above.

When the pseudo-random function processing controller 212 generates the secret key for distributing to the transmission source device and the repeater device, that is, when the pseudo-random function processing controller 212 functions as a part of the key generating device 203, the pseudo-random function processing controller 212 performs recursive control by inputting the local ID extracted by the hierarchy separation unit 240 into the pseudo-random function processing unit 211, sequentially from the higher-order hierarchy. Specifically, the pseudo-random function processing controller 212 performs the following control.

The pseudo-random function processing controller 212 performs control to derive a secret key, by inputting into the pseudo-random function processing unit 211 the destination device key and the extracted local ID of the communication device 100 of the first hierarchy. The pseudo-random function processing controller 212 performs control to derive recursively the secret key, by inputting into the pseudo-random function processing unit 211 the secret key derived thereby and the derived local ID of the communication device 100 of the k-th hierarchy (k is a positive integer between 2 and N inclusive, and N is the number of the local IDs extracted by the hierarchy separation unit 240).

The pseudo-random function processing controller 212 first performs control to derive the secret key corresponding to the local ID of the first hierarchy, by using the destination device key and the local ID of the first hierarchy, then performs control to repeat the processing to derive the secret key corresponding to the local ID of the k-th hierarchy by using the secret key derived by using the local ID of the (k−1)-th hierarchy and the local ID of the k-th hierarchy.

Accordingly, the pseudo-random function processing controller 212 performs control to generate the predetermined secret key of the communication device 100 of the N-th hierarchy as a distribution target of the secret key.

Figure 7:
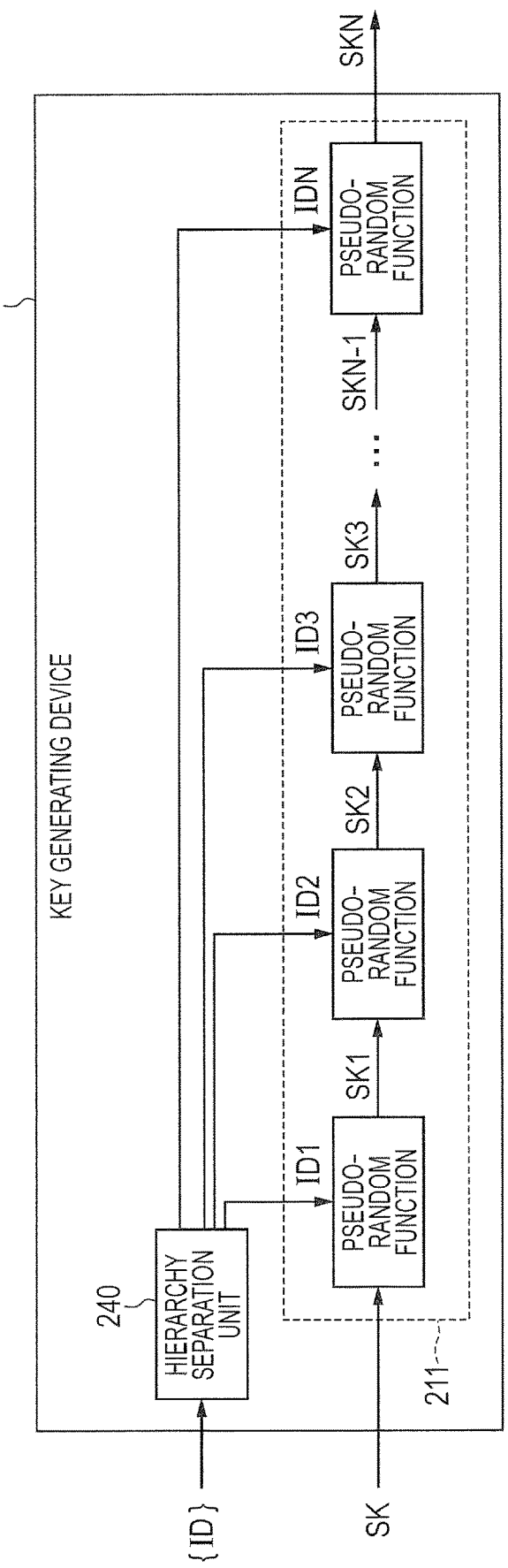
FIG. 7 is a schematic diagram illustrating the flow of processing in a key generating device according to Embodiment 1.

FIG. 7 is a schematic diagram illustrating the flow of the processing described above in the key generating device 203. In FIG. 7, {ID} indicates the hierarchical ID of the communication device 100 as the distribution target of the secret key. ID1, ID2, . . . , IDN indicate the local IDs, and the indexes thereof indicate that the local ID corresponds to the communication device 100 of which hierarchy. For example, ID1 indicates the local ID of the communication device 100 of the first hierarchy, and IDN indicates the local ID of the communication device 100 of the N-th hierarchy. SK indicates the destination device key that the data receiving device has. SK1, SK2, . . . , SKN indicate the secret keys, and the indexes thereof indicate that the secret key corresponds to the secret key to be distributed to the communication device 100 of which hierarchy. As illustrated in FIG. 7, the key generating device 203 generates the secret key to be distributed to the communication device 100 having the inputted hierarchical ID, by repeating the processing by the pseudo-random function by using the secret key and the local ID extracted from the hierarchical ID of the communication device 100 of the N-th hierarchy.

Next, the following explains the control of the pseudo-random function processing controller 212 when the transmission of data from the transmission source device is performed. When performing the transmission of data from the transmission source device, that is, when the pseudo-random function processing controller 212 functions as a part of the verification device 204, the pseudo-random function processing controller 212 performs recursive control by inputting the local ID extracted by the hierarchy separation unit 240 into the pseudo-random function processing unit 211 sequentially from the higher-order hierarchy. Specifically, the pseudo-random function processing controller 212 performs the following control.

The pseudo-random function processing controller 212 performs control to derive a secret key, by inputting into the pseudo-random function processing unit 211 the destination device key and the extracted local ID of the communication device 100 of the first hierarchy. The pseudo-random function processing controller 212 performs control to generate the secret key corresponding to the local ID of each communication device 100 from the first hierarchy to the N-th hierarchy, by inputting into the pseudo-random function processing unit 211 the secret key derived thereby and the extracted local ID of the communication device 100 of the k-th hierarchy to derive recursively the secret key (k is a positive integer between 2 and N inclusive, and N is the number of extracted local IDs).

That is, as is the case with functioning as a part of the key generating device 203, the pseudo-random function processing controller 212 functioning as a part of the verification device 204 first performs control to derive the secret key corresponding to the local ID of the first hierarchy by using the destination device key and the local ID of the first hierarchy, then performs control to repeat the processing to derive the secret key corresponding to the local ID of the k-th hierarchy by using the secret key derived by using the local ID of the (k−1)-th hierarchy and the local ID of the k-th hierarchy.

In this way, when functioning as apart of the verification device 204, the pseudo-random function processing controller 212 restores the secret key that has been distributed to the communication device 100, from the received information.

Here, in the present embodiment, the transmission source device and the repeater device generate the derivation key from the secret key that the data receiving device has distributed as described above. Therefore, it is necessary for the verification device 204 to reproduce the derivation key. Therefore, in the present embodiment, when functioning as apart of the verification device 204, the pseudo-random function processing controller 212 performs the recursive control, by inputting the local ID extracted by the hierarchy separation unit 240 into the pseudo-random function processing unit 211 sequentially from the higher-order hierarchy, as follows.

When the receiver 201 receives data, a list, and a MAC generated by the repeater device, the pseudo-random function processing controller 212 performs control to derive a temporary secret key, by inputting into the pseudo-random function processing unit 211 the destination device key and the extracted local ID of the communication device 100 of the first hierarchy. This temporary secret key corresponds to the secret key generated by the key generating device 203 (that is, the key as the source of the derivation key). Then, the pseudo-random function processing controller 212 performs control to derive the true secret key by inputting this temporary secret key and the derivation key setting value into the pseudo-random function processing unit 211. This true secret key corresponds to the derivation key. That is, the derivation key is reproduced in the verification device 204. The pseudo-random function processing controller 212 performs control to derive recursively the temporary secret key and the true secret key, by inputting into the pseudo-random function processing unit 211 the derived temporary secret key and the extracted local ID of the communication device 100 of the k-th hierarchy (k is a positive integer between 2 and N inclusive, and N is the number of extracted local IDs).

That is, the pseudo-random function processing controller 212 first performs control to derive the secret key corresponding to the local ID of the first hierarchy by using the destination device key and the local ID of the first hierarchy, then performs control to derive the derivation key corresponding to the local ID of the first hierarchy by using the secret key and the derivation key setting value. Then the pseudo-random function processing controller 212 first performs control to derive the secret key corresponding to the local ID of the k-th hierarchy by using the secret key derived using the local ID of the (k−1)-th hierarchy and the local ID of the k-th hierarchy, then performs control to repeat the processing to derive the derivation key corresponding to the local ID of the k-th hierarchy by using the secret key and the derivation key setting value.

Accordingly, the pseudo-random function processing controller 212 performs control to generate the true secret key (that is, the derivation key) corresponding to the local ID of each communication device 100 from the first hierarchy to the N-th hierarchy.

As is the case with the MAC generating function processing unit 321, the MAC generating function processing unit 221 generates a MAC by performing arithmetic with the use of a predetermined MAC generating function. The processing in the MAC generating function processing unit 221 is controlled by the MAC generating function processing controller 222. The MAC generating function processing unit 221 corresponds to the MAC generating function processing unit 6 described above. The MAC generating function processing controller 222 corresponds to the MAC generating function processing controller 8 described above.

The MAC generating function processing controller 222 performs control to derive the MAC, by inputting into the MAC generating function processing unit 221 the data (message) received by the receiver 201 and the secret key corresponding to the extracted local ID of the communication device 100 of the N-th hierarchy. The MAC generating function processing controller 222 performs control to derive the MAC recursively, by inputting into the MAC generating function processing unit 221 the MAC derived thereby and the secret key corresponding to the extracted local ID of the communication device 100 of the m-th hierarchy (m is a positive integer between 1 and N−1 inclusive).

That is, the MAC generating function processing controller 222 reproduces the MAC generated by the communication device 100 of the N-th hierarchy, by using the transmitted data and the secret key (specifically, the true secret key as the key corresponding to the derivation key) generated by the pseudo-random function processing unit 211 and corresponding to the communication device 100 of the N-th hierarchy (that is, the communication device 100 estimated to be the transmission source device). Subsequently, the MAC generating function processing controller 222 performs control to repeat the processing to reproduce the MAC generated by the communication device 100 of the m-th hierarchy, by using the MAC reproduced about the communication device 100 of the (m+1)-th hierarchy, and the secret key (specifically, the true secret key as the key corresponding to the derivation key) corresponding to the communication device 100 of the m-th hierarchy.

Accordingly, the MAC generating function processing controller 222 performs control to generate the MAC corresponding to each communication device 100 from the N-th hierarchy to the first hierarchy.

The comparator 250 corresponds to above-described comparator 9. The comparator 250 compares the MAC received by the receiver 201 with the MAC corresponding to the communication device 100 of the first hierarchy generated by the MAC generating function processing unit 221. The comparator 250 outputs a comparison result. When the right data has been transmitted along the right path, two MACs are in agreement. When the data has been falsified or the data has not been transmitted along the right path, two MACs are not in agreement.

Figure 8:
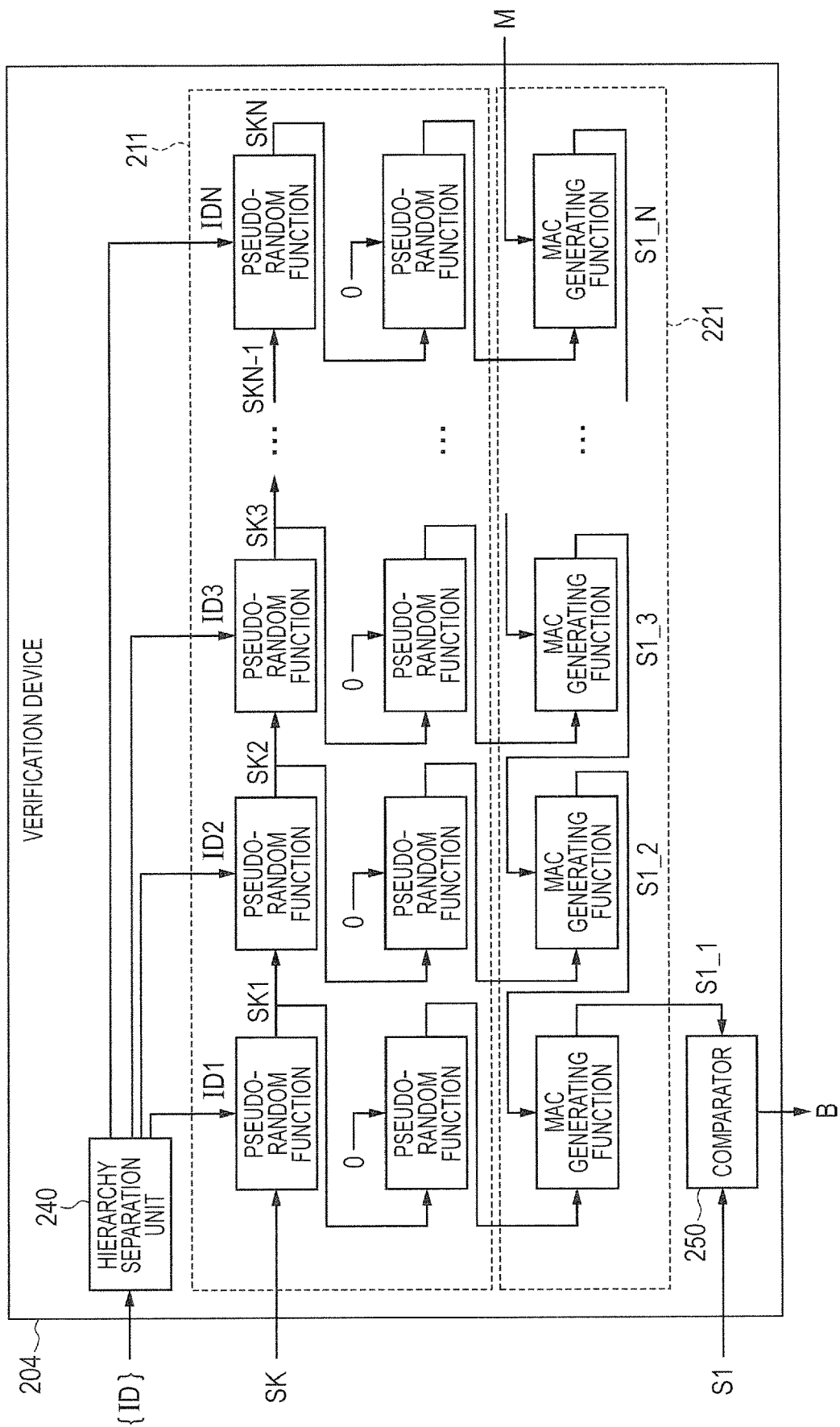
FIG. 8 is a schematic diagram illustrating the flow of processing in a verification device according to Embodiment 1.

FIG. 8 is a schematic diagram illustrating the flow of the above-described processing in the verification device 204. In FIG. 8, {ID} is a list of the local IDs received by the receiver 201 with the transmitted data (message). ID1, ID2, . . . , IDN indicate the local IDs, and the indexes thereof indicate that the local ID corresponds to the communication device 100 of which hierarchy. SK indicates the destination device key. SK1, SK2, . . . , SKN indicate the secret keys, and the indexes thereof indicate that the secret key corresponds to the communication device 100 of which hierarchy. SK1, SK2, . . . , SKN correspond to the temporary secret key described above, and are inputted into the pseudo-random function with the derivation key setting value (0 in the example illustrated in FIG. 8). Accordingly, the true secret key (derivation key) is generated and provided for the MAC generating function. In FIG. 8, M indicates the transmitted message, that is, data. S1_1, S1_2, . . . , S1_N indicate the MAC outputted by the MAC generating function processing unit 221, and the indexes thereof indicate that the MAC corresponds to the communication device 100 of which hierarchy. S1 is the MAC generated by the communication device 100 of the first hierarchy and received by the receiver 201 with the transmitted data (message). B indicates the comparison result by the comparator 250.

As illustrated in FIG. 8, the verification device 204 reproduces the authentication generating performed when the data is transmitted from the transmission source device to the data receiving device, and the verification device 204 generates the MAC. Then, the verification device 204 verifies whether the right data is received and whether the data is transmitted along the right path, by comparing the generated MAC with the received MAC.

Figure 9:
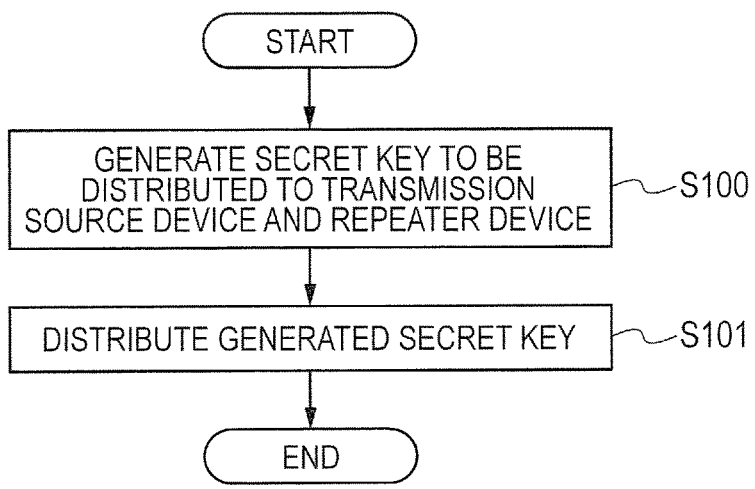
FIG. 9 is a flowchart illustrating an example of the flow of operation of the initial setting in the data transmission system according to Embodiment 1.

Next, the operation of the data transmission system 10 is explained. First, the initial setting is explained. FIG. 9 is a flowchart illustrating an example of the flow of operation of the initial setting in the data transmission system 10. This initial setting is performed in the environment where tapping by a malicious aggressor is not performed.

First, at Step 100 (S100), the key generating device 203 generates the secret key to be distributed to the transmission source device and the repeater device. The hierarchical ID is required when the key generating device 203 generates the secret key. The local ID is assigned in advance to the communication device 100 as the repeater device and the communication device 100 as the transmission source device. When the hierarchical ID is already decided, each communication device 100 transmits the hierarchical ID to the communication device 100 as the data receiving device via the communication device 100 of the higher-order node. It suffices that the key generating device 203 acquires the hierarchical ID of the communication device 100 as the distribution destination of the secret key when generating the secret key. It is needless to say that not only the above-described method but other arbitrary methods can be employed as the acquisition method of the hierarchical ID.

When the local ID is not assigned for the communication device 100, the value of predetermined length excluding the derivation key setting value is assigned to the communication device 100 concerned as the local ID. For example, when a communication device 100 is newly added to the lower order position of the repeater device to which the local ID is already assigned, as a lower-order node that performs direct communication with the repeater device concerned, this repeater device may newly issue a local ID, and may assign it to the lower-order node concerned. At this time, the repeater device issues the local ID so that it may not duplicate with the local ID already assigned to other lower-order nodes that perform direct communication with the repeater device concerned. This is for enabling to specify the communication device 100 in the network uniquely by the hierarchical ID. As a method to assign an unduplicated local ID to each communication device 100, a value may be assigned in order, like 1, 2, and 3, or a value chosen at random from sufficiently long bit length (for example, 128 bits) may be assigned. The data receiving device may perform assignment of the local IDs, or a specific repeater device may perform assignment of the local IDs for all the lower-order nodes.

When the receiver 201 of the communication device 100 as the data receiving device receives a hierarchical ID, the key generating device 203 generates the secret key corresponding to the hierarchical ID using the hierarchical ID and the destination device key. It is assumed that the hierarchical ID inputted to the key generating device 203 is {ID1, ID2, ID3, . . . , IDN}. The hierarchy separation unit 240 extracts the local ID for every hierarchy. The pseudo-random function processing controller 212 inputs SK as a secret key into the pseudo-random function, inputs ID1 as the local ID of the first hierarchy as a message, and obtains SK1. Next, the pseudo-random function processing controller 212 inputs SK1 as a secret key into the pseudo-random function, inputs ID2 as the local ID of the second hierarchy as a message, and obtains SK2. The pseudo-random function processing controller 212 repeats this processing recursively, and finally inputs SKN−1 as a secret key into the pseudo-random function, inputs IDN as the local ID of the N-th hierarchy as a message, and obtains SKN. Then, the pseudo-random function processing controller 212 outputs this SKN as the secret key for the hierarchical ID concerned.

In the initial setting, the processing at Step 101 is performed after Step 100. At Step 101 (S101), the secret key generated by the key generating device 203 is distributed. The transmitter 202 of the communication device 100 as the data receiving device obtains SKN from the key generating device 203, and then transmits SKN to the communication device 100 corresponding to the hierarchical ID concerned. The transmission of SKN may be performed via the communication device 100 as the repeater device. The initial setting is completed at the end of Step 101. After the initial setting, all the communication devices 100 of the transmission source device and the repeater device have eventually the local ID and the secret key.

Figure 10:
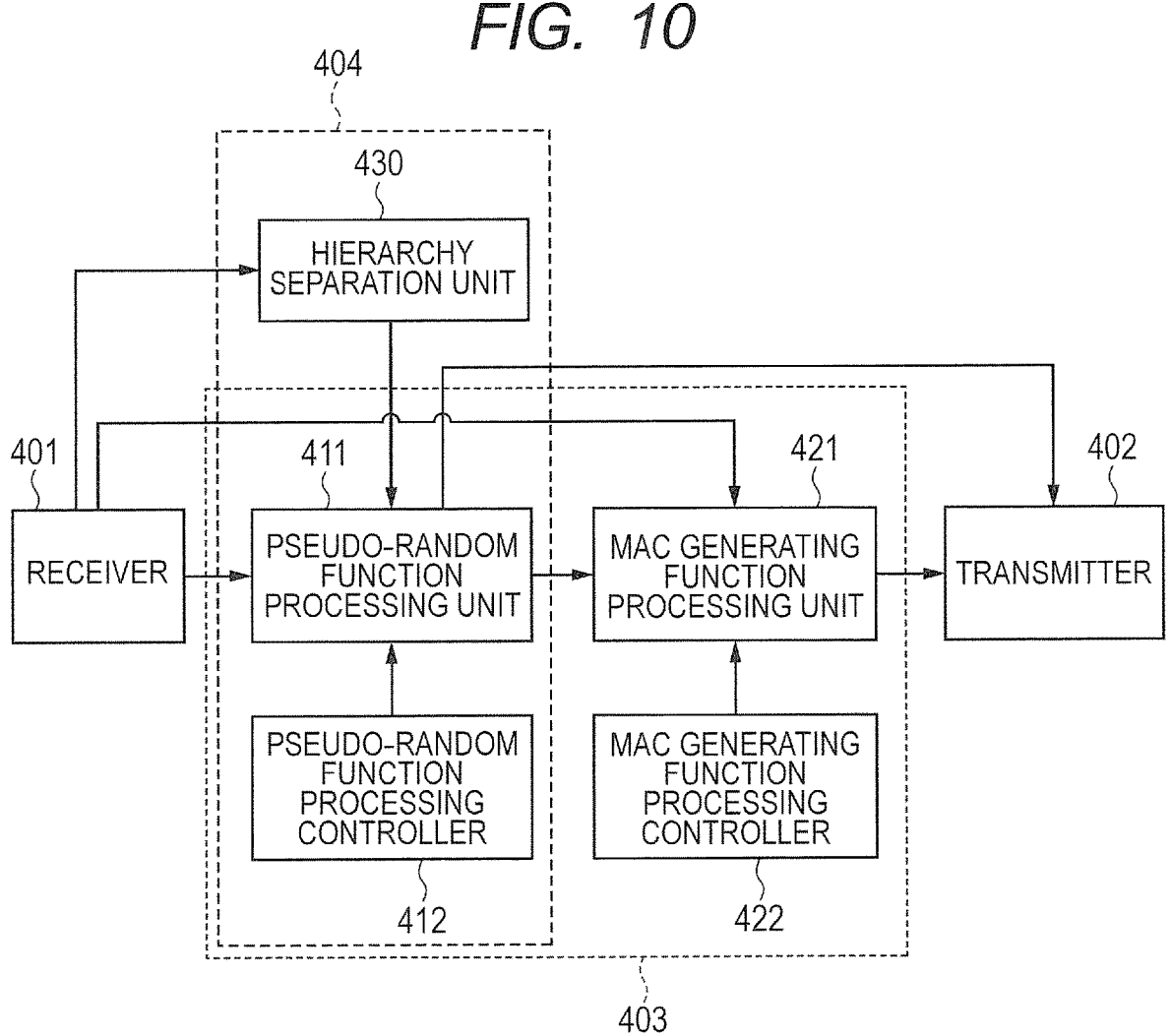
FIG. 10 is a block diagram illustrating an example of the configuration of the repeater device when a communication device as the repeater device generates a key for a lower-order node.

In the above, the generation operation of the secret key is explained. In the explanation described above, the secret key to be distributed is generated by the communication device 100 as the data receiving device. However, the data receiving device can also entrust the generation of the secret key for the lower-order node to the repeater device. In this case, the communication device 100 as the repeater device needs only to have the same configuration as the key generating device 203 described above. FIG. 10 is a block diagram illustrating an example of the configuration of the repeater device when the communication device 100 as the repeater device generates a key for the lower-order node.

The configuration illustrated in FIG. 10 is different from the configuration illustrated in FIG. 5 in that a hierarchy separation unit 430 is included. The hierarchy separation unit 430 is also called an identifier extraction unit. In the repeater device illustrated in FIG. 10, the key generating device 404 is comprised of the hierarchy separation unit 430, the pseudo-random function processing unit 411, and the pseudo-random function processing controller 412.

The hierarchy separation unit 430 extracts the local ID of the communication device 100 of each hierarchy from the list of the local IDs from the target device to the communication device 100 of the immediately lower order of the repeater device. Specifically, this target device indicates the communication device 100 of the lower order of the repeater device concerned, and the communication device 100 as the distribution target of the secret key. The communication device 100 of the immediately lower order of the repeater device indicates the lower-order communication device 100 that can perform direct communication with the repeater device. The case where the communication device 100_1b illustrated in FIG. 2 generates a secret key to be distributed to the communication device 100_3a is explained as an example. It is assumed that the local ID of the communication device 100_2b is ID2 and the local ID of the communication device 100_3a is ID3. The hierarchy separation unit 430 of the communication device 100_1b extracts ID2 and ID3 as the local ID of the communication device 100 of each hierarchy, from the list {ID2, ID3} of the local IDs.

In the repeater device illustrated in FIG. 10, in addition to the above-described control for generating the derivation key of an own device, the pseudo-random function processing controller 412 performs the following control to generate the secret key to be distributed to the lower-order communication device 100. That is, the pseudo-random function processing controller 412 performs recursive control, by inputting into the pseudo-random function processing unit 411 the local ID extracted by the hierarchy separation unit 430, sequentially from the higher-order hierarchy. Specifically, the pseudo-random function processing controller 412 performs the following control.

The pseudo-random function processing controller 412 performs control to derive the secret key, by inputting into the pseudo-random function processing unit 411 the secret key unique to the repeater device concerned and the extracted local ID of the communication device 100 of the first hierarchy when observed from the repeater device concerned. The pseudo-random function processing controller 412 performs control to derive the secret key recursively, by inputting into the pseudo-random function processing unit 411 the derived secret key and the extracted local ID of the communication device 100 of the k-th hierarchy when observed from the repeater device concerned (k is a positive integer between 2 and N inclusive, and N is the number of the local IDs extracted by the hierarchy separation unit 430). The above-described unique secret key is a source of the derivation key of the repeater device concerned.

The pseudo-random function processing controller 412 first performs control to derive the secret key corresponding to the local ID of the first hierarchy by using the secret key assigned to the repeater device concerned and the local ID of the communication device 100 of the immediately lower order (the communication device 100 of the first hierarchy), and then performs control to repeat the processing to derive the secret key corresponding to the local ID of the k-th hierarchy by using the secret key derived by using the local ID of the (k−1)-th hierarchy and the local ID of k-th hierarchy.

Accordingly, the pseudo-random function processing controller 412 performs control to generate the secret key of the lower-order communication device 100 as the distribution target of the secret key. Therefore, in this case, the lower-order communication device 100 generates the MAC eventually, by using, as a unique secret key, the secret key (derivation key) generated on the basis of the secret key generated by the pseudo-random function processing unit 411.

Therefore, when the repeater device generates the secret key for the lower-order communication device 100, the data transmission system 10 operates as follows. First, the repeater device transmits the own hierarchical ID to the data receiving device. Then, the repeater device receives the secret key corresponding to the hierarchical ID concerned, generated by the key generating device 203 of the data receiving device. The repeater device inputs the received secret key into the key generating device 404 and performs the same operation as in the key generating device 203. When the repeater device receives the list of the local IDs from the lower-order node to the repeater device concerned, the hierarchy separation unit 430 extracts the local IDs. Then, the pseudo-random function processing controller 412 performs control to generate recursively the secret key for the lower-order hierarchy with the use of the pseudo-random function.

The secret key to be distributed to each communication device 100 is uniquely decided by the hierarchical ID of the communication device 100 concerned and the destination device key. Therefore, in either case of the key generation by the data receiving device as the highest-order node and the key generation by the repeater device, the same secret key is generated for the same communication device 100. In this way, for the lower-order node, the repeater device can generate the same secret key as the secret key generated by the data receiving device. Accordingly, the communication device of a child node can be dynamically added to the network.

Figure 11:
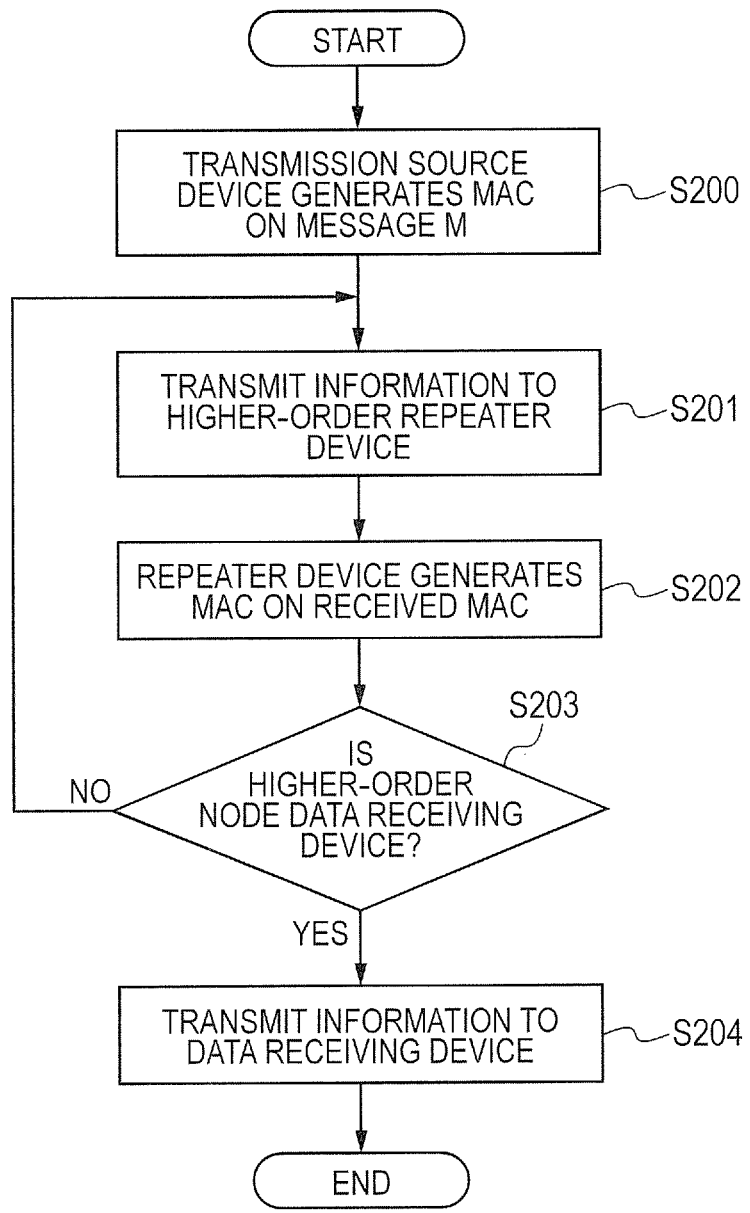
FIG. 11 is a flow chart illustrating an example of the flow of operation of transmission in the data transmission system according to Embodiment 1.
Figure 12:
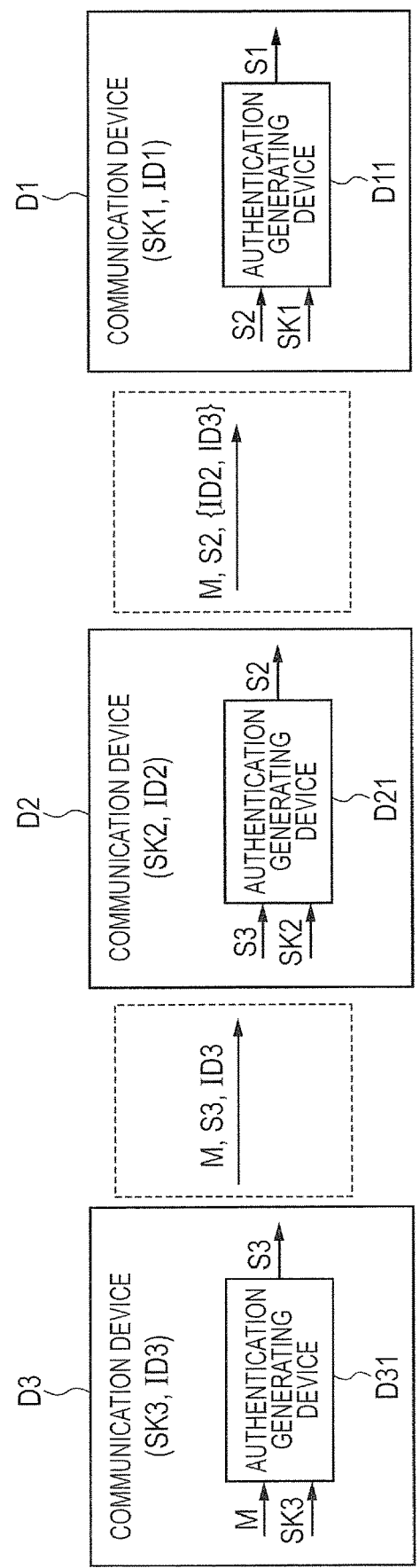
FIG. 12 is a schematic diagram illustrating an information flow with a concrete example of a transmission path in a transmission source device and a repeater device.
Figure 13:
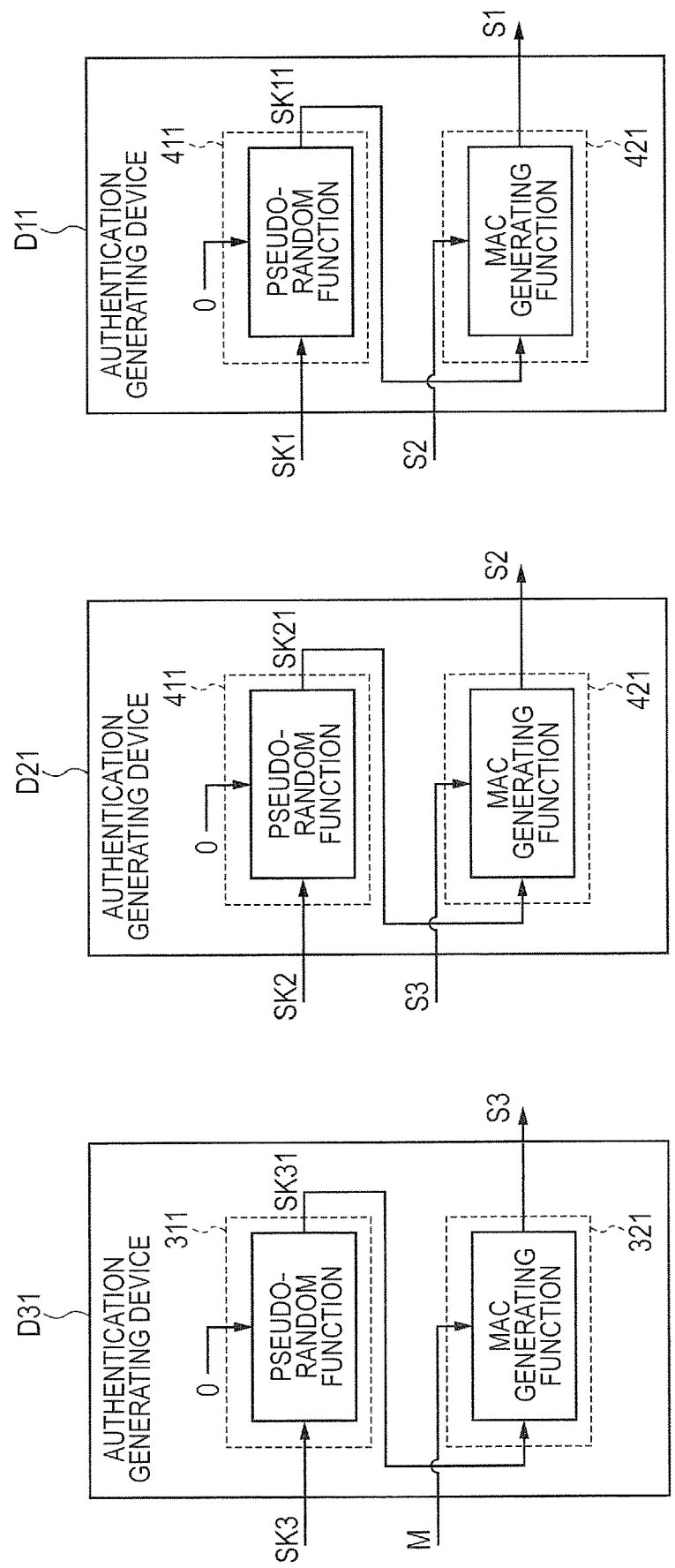
FIG. 13 is a schematic diagram illustrating the flow of processing of an authentication generating device in each communication device illustrated in FIG. 12.

Next, the following explains the operation of the data transmission system 10 for transmitting safely a message M as data of a transmission target from the communication device 100 as the transmission source device to the communication device 100 as the data receiving device. FIG. 11 is a flow chart illustrating an example of the flow of operation of transmission in the data transmission system 10. FIG. 12 is a schematic diagram illustrating an information flow with a concrete example of a transmission path between the transmission source device and the repeater device. FIG. 13 is a schematic diagram illustrating the flow of processing of the authentication generating device in each communication device illustrated in FIG. 12. Hereinafter, the flow chart illustrated in FIG. 11 is explained, referring properly to FIG. 12 and FIG. 13.

In FIG. 12, the communication device 100 as the transmission source device is called a communication device D3, the communication device 100 as the repeater device of the higher order of the communication device D3 is called a communication device D2, and the communication device 100 as the repeater device of the higher order of the communication device D2 and as a node of the immediately lower order of the data receiving device is called a communication device D1. It is assumed that the local ID of the communication device D1 is ID1, the local ID of the communication device D2 is ID2, and the local ID of the communication device D3 is ID3. In this case, the hierarchical ID of the communication device D3 is {ID1, ID2, ID3}. It is also assumed that a secret key SK1 is distributed to the communication device D1 from the communication device 100 as the data receiving device, and that the communication device D1 stores the secret key SK1 in a memory device (not shown). In the same manner, it is assumed that the communication device D2 stores a distributed secret key SK2 in a memory device (not shown), and that the communication device D3 stores a distributed secret key SK3 in a memory device (not shown). The authentication generating device 303 included in the communication device D3 is called an authentication generating device D31, the authentication generating device 403 included in the communication device D2 is called an authentication generating device D21, and the authentication generating device 403 included in the communication device D1 is called an authentication generating device D11. On the premise of reference numerals described above, FIG. 12 illustrates the values held by the communication devices D1, D2, and D3 after the initial setting, the input-output of the authentication generating devices, and the communication content between nodes.

When the message M is transmitted, first, at Step 200 (S200), the communication device 100 as the transmission source device generates a MAC about the message M. For details, first, the pseudo-random function processing unit 311 of the authentication generating device 303 of the transmission source device generates a derivation key from the distributed secret key. Then, the MAC generating function processing unit 321 of the authentication generating device 303 of the transmission source device generates a MAC on the message M using the derivation key.

When explained in detail based on the examples illustrated in FIG. 12 and FIG. 13, at Step 200, the communication device D3 operates as follows. The communication device D3 inputs the message M and the secret key SK3 into the authentication generating device D31. In the authentication generating device D31, first, the pseudo-random function processing unit 311 inputs SK3 as the secret key, inputs 0 as the message, and generates a derivation key SK31. Next, the MAC generating function processing unit 321 inputs the derivation key SK31 as the secret key, inputs M as the message, and outputs a MAC value S3 as the calculation result.

After Step 200, the processing advances to Step 201 (S201).

At Step 201, the information is transferred to the higher-order repeater device. Specifically, the transmission source device transmits the message M, the MAC value generated by the authentication generating device 303, and the local ID of the transmission source device, to the higher-order repeater device. When explained in detail according to the example, the transmitter 302 of the communication device D3 transmits (M, S3, ID3) to the communication device D2.

After Step 201, the processing advances to Step 202 (S202).

At Step 202, the repeater device generates a MAC on the received MAC. For details, first, the pseudo-random function processing unit 411 of the authentication generating device 403 of the repeater device generates a derivation key from the distributed secret key. Then, the MAC generating function processing unit 421 of the authentication generating device 403 of the repeater device generates a MAC on the received MAC using the derivation key.

When explained in detail according to the example, at Step 202, the communication device D2 operates as follows. The receiver 401 of the communication device D2 receives (M, S3, ID3) from the communication device D3 and inputs the MAC value S3 and the secret key SK2 into the authentication generating device D21. In the authentication generating device D21, first, the pseudo-random function processing unit 411 inputs SK2 as the secret key, inputs 0 as the message, and generates a derivation key SK21. Next, the MAC generating function processing unit 421 inputs the derivation key SK21 as the secret key, inputs the MAC value S3 as the message, and outputs a MAC value S2 as the calculation result.

After Step 202, when the higher-order node of the repeater device concerned is not a data receiving device (No at Step 203 (S203)), the processing returns to Step 201 and the transmission of the information to another repeater device is performed. Specifically, the repeater device transmits the message M, the MAC value generated by the authentication generating device 403, the received local ID (the local ID group), and the local ID of the repeater device concerned, to the higher-order repeater device. When explained in detail according to the example, the transmitter 402 of the communication device D2 transmits (M, S2, {ID2, ID3}) to the communication device D1.

The communication device D1 performs the same operation as the communication device D2. That is, the receiver 401 of the communication device D1 receives (M, S2, {ID2, ID3}) from the communication device D2 and inputs the MAC value S2 and the secret key SK1 into the authentication generating device D11. In the authentication generating device D11, first, the pseudo-random function processing unit 411 inputs SK1 as the secret key, inputs 0 as the message, and generates a derivation key SK11. Next, the MAC generating function processing unit 421 inputs the derivation key SK11 as the secret key, inputs the MAC value S2 as the message, and outputs a MAC value S1 as the calculation result.

On the other hand, when the higher-order node of the repeater device concerned is a data receiving device (Yes at Step 203), the processing shifts to Step 204.

At Step 204 (S204), the repeater device transfers the information to the data receiving device. Specifically, the repeater device transmits, to the data receiving device, the message M, the MAC value generated by the authentication generating device 403, the received local ID (the local ID group), and the local ID of the repeater device concerned. When explained in detail according to the example, the transmitter 402 of the communication device D1 transmits (M, S1, {ID1, ID2, ID3}) to the communication device 100 as the data receiving device.

Figure 14:
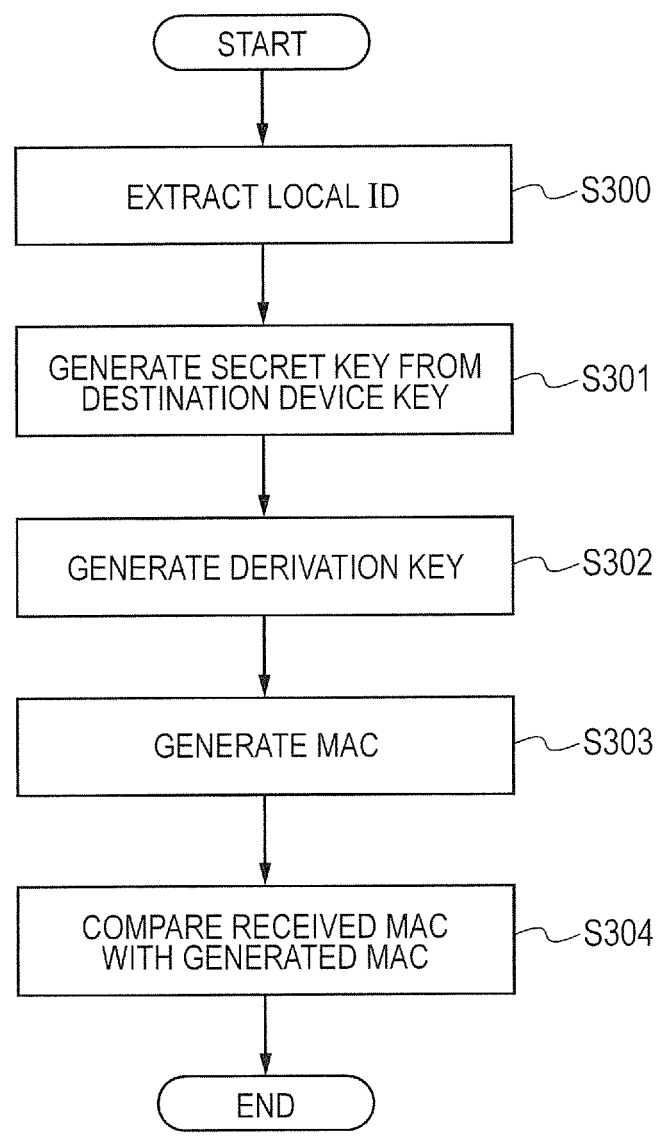
FIG. 14 is a flow chart illustrating an example of the flow of verification operation in the data receiving device according to Embodiment 1.

Next, the verification operation in the communication device 100 as the data receiving device is explained. FIG. 14 is a flow chart illustrating an example of the flow of the verification operation in the data receiving device. When the receiver 201 receives the information including the message M from the repeater device, the data receiving device performs the verification processing by the verification device 204, as shown in the following.

At Step 300 (S300), the hierarchy separation unit 240 extracts the local ID of the communication device 100 of each hierarchy in the transmission path of the message M from the list of the local IDs received by the receiver 201. In the above-described example, the receiver 201 receives {ID1, ID2, ID3} and this corresponds to the hierarchical ID of the transmission source device. At this step, from the list of the local ID, separation of N hierarchies (N is an arbitrary integer) is performed to extract N local IDs. In the above-described example, the hierarchy separation unit 240 separates the list of the local ID into three hierarchies, ID1, ID2, and ID3, and extracts three local IDs.

Next, at Step 301 (S301), the pseudo-random function processing unit 211 and the pseudo-random function processing controller 212 generate a secret key using the extracted local ID and the destination device key SK stored in the secret key storage unit 230. Specifically, the pseudo-random function processing unit 211 and the pseudo-random function processing controller 212 sets that $SK0'=SK$ and executes the following for i of $0 \le i < N$. The pseudo-random function processing controller 212 inputs $SKi'$ as the secret key into the pseudo-random function processing unit 211, inputs the local ID of the (i+1)-th hierarchy, $IDi+1$, as the message, and obtains $SKi+1'$ from the pseudo-random function processing unit 211. When each received local ID agrees with the local ID of the communication device 100 in the right transmission path (that is, the transmission path specified by the network in the data transmission system 10), the value from $SK1'$ to $SKN'$ generated at this time agrees with the secret key (the distributed secret key) given to the communication device 100 in the right transmission path.

Next, at Step 302 (S302), the pseudo-random function processing unit 211 and the pseudo-random function processing controller 212 generate the derivation key using the secret key generated at Step 301 and the derivation key setting value. Specifically, the pseudo-random function processing unit 211 and the pseudo-random function processing controller 212 executes the following for i of $1 \le i \le N$. The pseudo-random function processing controller 212 inputs $SKi'$ as the secret key into the pseudo-random function processing unit 211, inputs 0 as the message, and obtains the derivation key $SKi\_1'$. When each received local ID agrees with the local ID of the communication device 100 in the right transmission path, the value from $SK1\_1'$ to $SKN\_1'$ generated at this time agrees with the derivation key that is used by the communication device 100 in the right transmission path to generate the MAC.

Next, at Step 303 (S303), the MAC generating function processing unit 221 and the MAC generating function processing controller 222 generate the MAC using the received message M and the derivation key generated at Step 302. Specifically, the MAC generating function processing unit 221 and the MAC generating function processing controller 222 set that $S1\_N+1=M$ and execute the following for i of $N \ge i \ge 1$. The MAC generating function processing controller 222 inputs $SKi\_1'$ as the secret key into the MAC generating function processing unit 221, inputs $S1\_i+1$ as the message, and obtains $S1\_i$. When the message M is transmitted correctly, each value from $S1\_N$ to $S1\_1$ generated at this time agrees with the MAC value generated by the communication device 100 of each hierarchy from the data receiving device to the transmission source device.

Next, at Step 304 (S304), the comparator 250 compares the received MAC with the MAC corresponding to the communication device 100 of the first hierarchy generated at Step 303. Specifically, the comparator 250 compares $S1\_1$ generated at Step 303 with the received S1, and determines whether both values are in agreement. The comparator 250 outputs the output value $B=1$ when both are in agreement, otherwise, outputs the output value $B=0$. Here, when $B=1$, it means that the message M has been transmitted without falsification and in the right transmission path from the transmission source device. When $B=0$, it means that the message M has been falsified or has been transmitted via a communication device other than the communication device in the right transmission path. The data receiving device may include a determination unit (not shown) that determines the safety of the transmission in this way based on the output value of the comparator 250.

Here, supplementary explanation is given to the verification based on the comparison result of the comparator 250. When the message M is falsified while the transmission source device or the repeater device transmits data to other communication devices, the proper input value is not inputted into the MAC generating function processing unit 6 at Step 303. Therefore, as long as the MAC generating function is safe, the verification by the verification device 204 is not successful.

When one of the MAC values S1, S2, ..., SN generated during the transmission is falsified, a proper MAC is not inputted into the MAC generating function processing unit 6 at Step 303. Therefore, as long as the MAC generating function is safe, the received S1 and the generated S1_1 are not in agreement and the verification by the verification device 204 is not successful.

As long as the pseudo-random function is safe, the conflicting probability (duplicating probability) that the secret key generated by the pseudo-random function conflict with other secret keys or derivation keys becomes small exponentially depending on the number of bits of the key. Therefore, when the list of the local IDs as the information indicating the data transmission path is falsified, a proper secret key is not generated at Step 301. Therefore, a proper secret key is not inputted into the MAC generating function processing unit 6 and the verification by the verification device 204 is not successful.

When the safety for k bits is required and when it is required that the safety of the pseudo-random function is not influenced with the probability greater than $2^{-k}$, the secret key inputted into the pseudo-random function and the secret key outputted from the pseudo-random function or the derivation key are more than k bits. When the safety for k bits is required and when it is required that the safety of the MAC generating function is not influenced with the probability greater than $2^{-k}$, the output of the MAC generating function is more than 2×k bits.

In the above, Embodiment 1 is explained. As described above, according to the data transmission system 10 according to Embodiment 1, it is possible to verify whether the transmitted data is not falsified and whether the data is transmitted along the right path.

Moreover, as described above, the secret key for each communication device 100 is generated by the key generating device 203, based on the destination device key. Therefore, the secret key that the data receiving device controls is only the destination device key, independently of the number of nodes on the network. Accordingly, it is easy to manage the key in the device functioning as the verification device. The repeater device and the transmission source device need only to manage the distributed secret key. Accordingly, it is easy to manage the key.

In particular, according to Embodiment 1, not calculating the MAC directly from the distributed secret key as it is, the transmission source device and the repeater device generate the derivation key first and then calculate the MAC using this derivation key. Therefore, it is secured to use different secret keys in the ciphering algorithm (pseudo-random function) for deriving the secret key and in the ciphering algorithm (MAC generating function) for calculating the MAC. Accordingly, it is possible to realize the securer system.

In Embodiment 1, the configuration in which the MAC is generated using the derivation key is shown. However, it is not necessary to generate the derivation key. That is, the MAC may be generated using the distributed secret key. That is, the secret key unique to the transmission source device and the repeater device needs only to be the secret key that is derived by performing arithmetic with the use of a predetermined pseudo-random function. In other words, the secret key unique to the communication device may mean the distributed secret key and may mean the derivation key generated from the distributed secret key. Even in other embodiments to be described later in addition to the present embodiment, the MAC may be generated not using the derivation key but using the distributed secret key. When not using the derivation key, the generation operation of the derivation key becomes unnecessary in the transmission source device, the repeater device, and the data receiving device. When the derivation key is not used and the repeater device includes the key generating device 404 described above, the pseudo-random function processing controller 412 performs control for generating the secret key for the lower-order communication devices, and does not perform control for generating the derivation key. When the derivation key is not used and the repeater device includes the key generating device 404 described above, the secret key unique to the communication device of the lower order of the repeater device concerned is the secret key generated by the pseudo-random function processing unit 411.

The bit length of the MAC value (S1) for the verification that the data receiving device receives is not dependent on the depth of the hierarchy up to the transmission source device. Then, when there is S1, it is possible to execute both the verification for the message M and the verification of the right transmission path concurrently. The calculation by the repeater device with the use of the MAC generating function is decided by the length of the fixed-length independent of the length of the message M (that is, by the length of the MAC value generated by the lower-order node). Therefore, the computation time is constant. Accordingly, even when the transmission source device outputs the message of various length, the load imposed on the repeater device is constant.

In recent years, in various technical fields including the field of an in-vehicle microcomputer, in the case of transmission of the sensor data from IoT equipment, a keen interest is shown in the technology of guaranteeing that the message as the sensor data is not falsified. Then, it is also important to secure that the data has been transmitted in the right path. The data transmission system 10 according to Embodiment 1 can meet such needs, realizing the efficient key management. The repeater device calculates not the MAC value on the message M but the MAC value on the MAC value received from the lower-order node. Therefore, it is possible to suppress the amount of calculation of the MAC value and the pertaining traffic.

Embodiment 2

Next, Embodiment 2 is explained. According to Embodiment 1, only the data receiving device executes the verification. On the other hand, in Embodiment 2, the repeater device executes the verification in addition. Accordingly, it is possible to check the MAC efficiently in Embodiment 2. Hereinafter, different points from Embodiment 1 are explained. According to the present embodiment, the operation of the transmission source device and the repeater device is different from that in Embodiment 1.

In the present embodiment, the MAC generating function processing controller 322 of the communication device 100 as the transmission source device performs the following control, in addition to the control explained in Embodiment 1. The MAC generating function processing controller 322 performs control to generate a MAC on the MAC generated by the MAC generating function processing unit 321, by inputting into the MAC generating function processing unit 321 the MAC on the data generated by the MAC generating function processing unit 321 (that is, the MAC obtained by inputting the data of the transmission target and the secret key into the MAC generating function processing unit 321) and the secret key unique to the transmission source device. Of the two MACs generated by the MAC generating function processing unit 321, the latter MAC is called a first MAC and the former MAC is called a second MAC.

Then, the transmitter 302 of the transmission source device of the present embodiment transmits, to the repeater device, the data of the transmission target, the two MACs generated based on the data by the MAC generating function processing unit 321, and the local ID of the transmission source device concerned.

Figure 15:
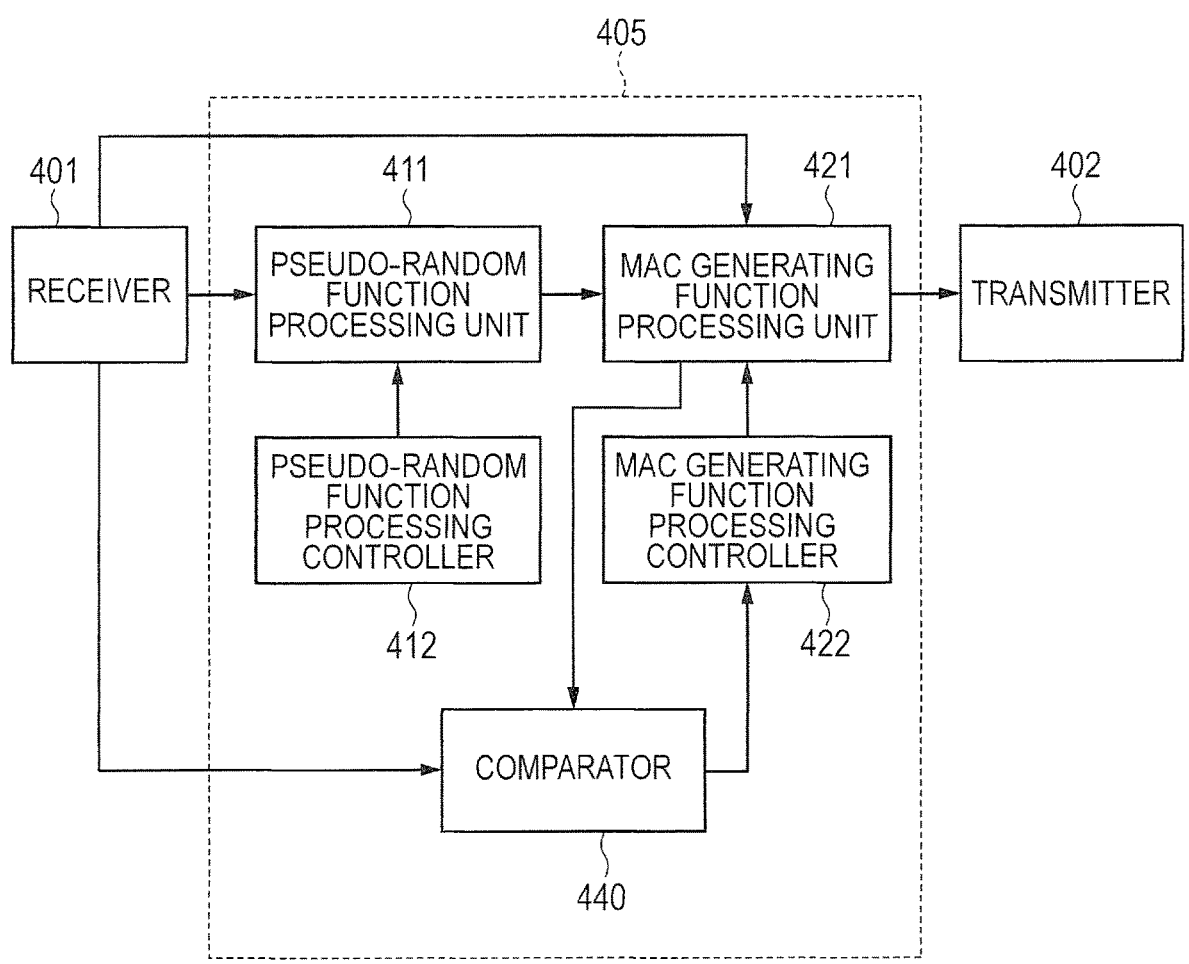
FIG. 15 is a block diagram illustrating an example of the configuration of a repeater device according to Embodiment 2.

Next, the repeater device according to Embodiment 2 is explained. FIG. 15 is a block diagram illustrating an example of the configuration of the repeater device according to Embodiment 2. The communication device 100 as the repeater device is different from the configuration shown in FIG. 5 in that the authentication generating device 403 is replaced with an authentication generating device 405. The authentication generating device 405 includes the pseudo-random function processing unit 411, the pseudo-random function processing controller 412, the MAC generating function processing unit 421, the MAC generating function processing controller 422, and a comparator 440.

In the present embodiment, the pseudo-random function processing controller 412 of the communication device 100 as the repeater device performs the following control in addition to the control explained in Embodiment 1. The pseudo-random function processing controller 412 performs control to generate a secret key unique to the communication device 100 that has performed transmission to the repeater device concerned, by inputting into the pseudo-random function processing unit 411 the secret key unique to the repeater device concerned and the local ID of the communication device 100 that has performed transmission to the repeater device concerned (that is, the communication device 100 of the immediately lower-order node of the repeater device concerned) among the local IDs received by the receiver 401.

The comparator 440 of the repeater device compares the first MAC of the two MACs received by the receiver 401 with the MAC generated by the MAC generating function processing unit 421. When the lower-order node is the transmission source device, the lower-order node transmits two MACs with the data of the transmission target. In addition, when the lower-order node is the repeater device, the repeater device as the lower-order node transmits two MACs with the data of the transmission target, as will be described later. Therefore, the receiver 401 of the repeater device receives two MACs with the data of the transmission target.

In the present embodiment, the MAC generating function processing controller 422 of the communication device 100 as the repeater device performs control to generate a MAC on the second MAC of the two MACs received by the receiver 401, by inputting into the MAC generating function processing unit 421 the second MAC concerned and the secret key unique to the communication device 100 that has performed transmission to the repeater device concerned. At this time, the comparator 440 compares the first MAC with the MAC on the second MAC. When the comparison result indicates the agreement, the MAC generating function processing controller 422 performs the following processing. When the comparison result does not indicate the agreement, the MAC generating function processing controller 422 stops the following processing. The MAC generating function processing controller 422 of the communication device 100 as the repeater device performs control to generate a MAC on the first MAC concerned, by inputting into the MAC generating function processing unit 421 the first MAC and the secret key unique to the repeater device concerned.

In the present embodiment, the transmitter 402 transmits, to the higher-order communication device 100 (that is, another repeater device or the data receiving device), the data of the transmission target, the first MAC, the MAC on the first MAC, the local ID of the repeater device concerned, and the local ID received by the receiver 401.

Figure 16:
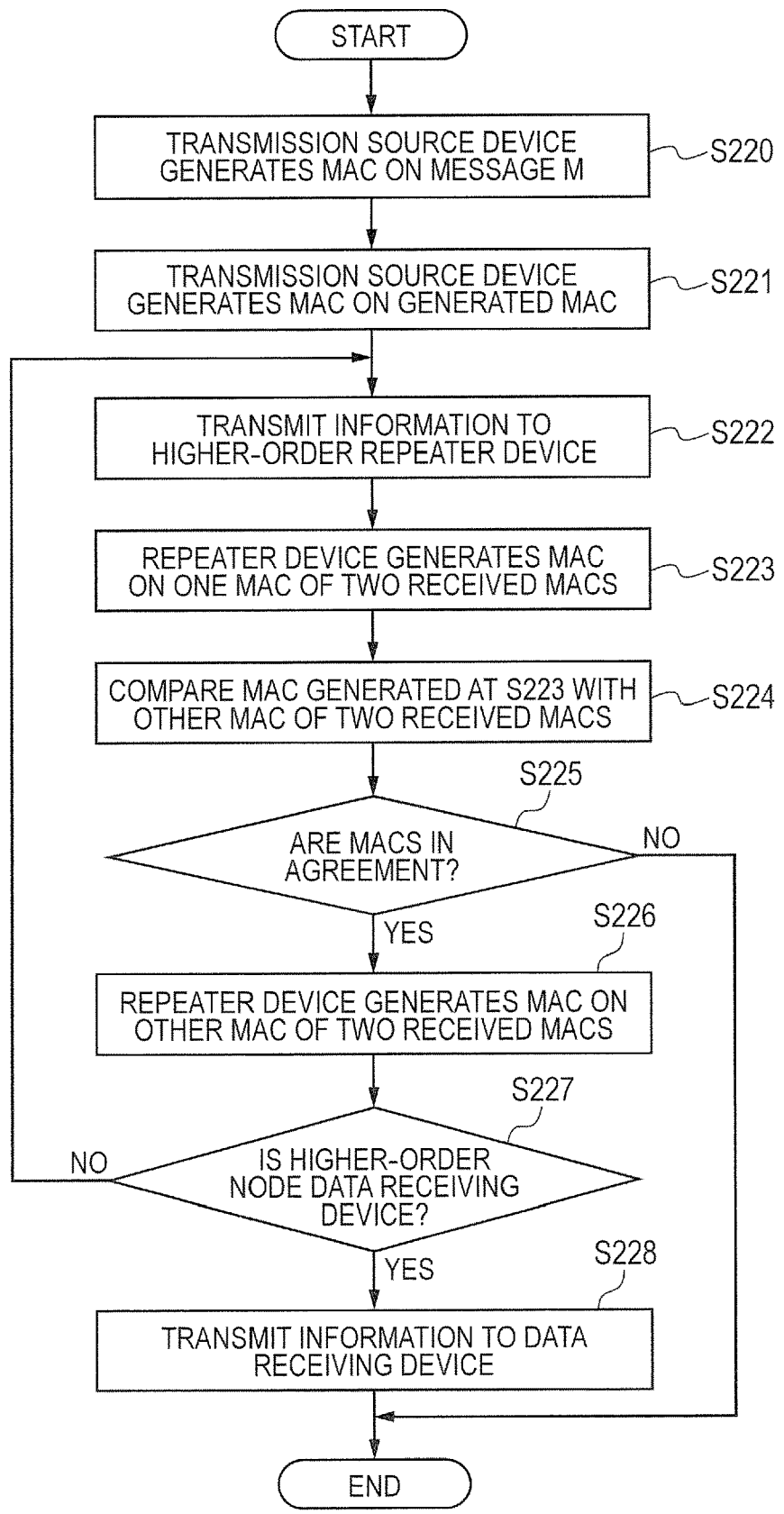
FIG. 16 is a flow chart illustrating an example of the flow of operation of transmission in a data transmission system according to Embodiment 2.
Figure 17:
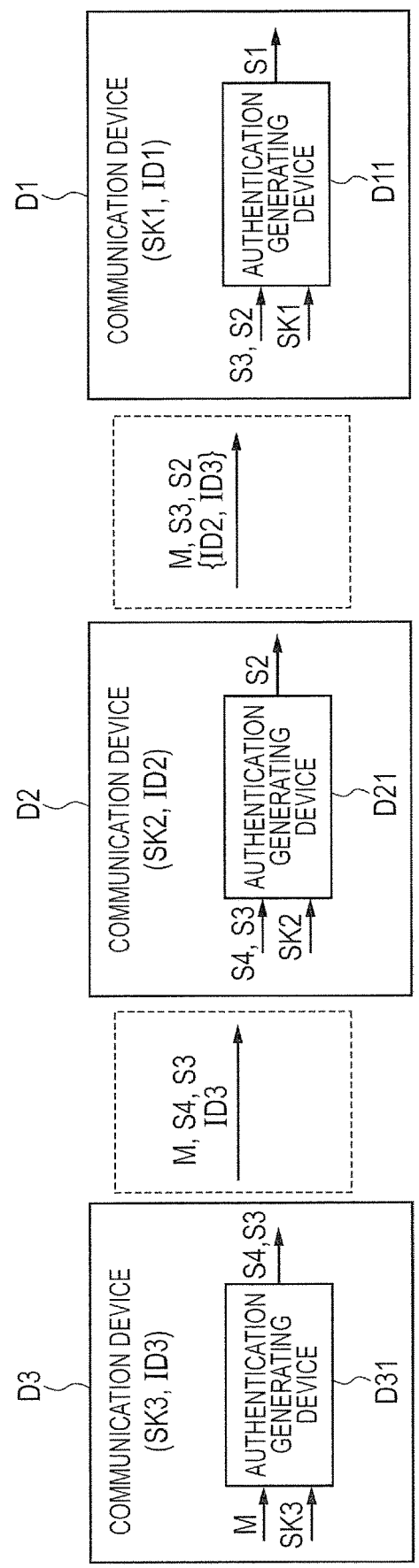
FIG. 17 is a schematic diagram illustrating an information flow with a concrete example of a transmission path in a transmission source device and a repeater device.
Figure 18A:
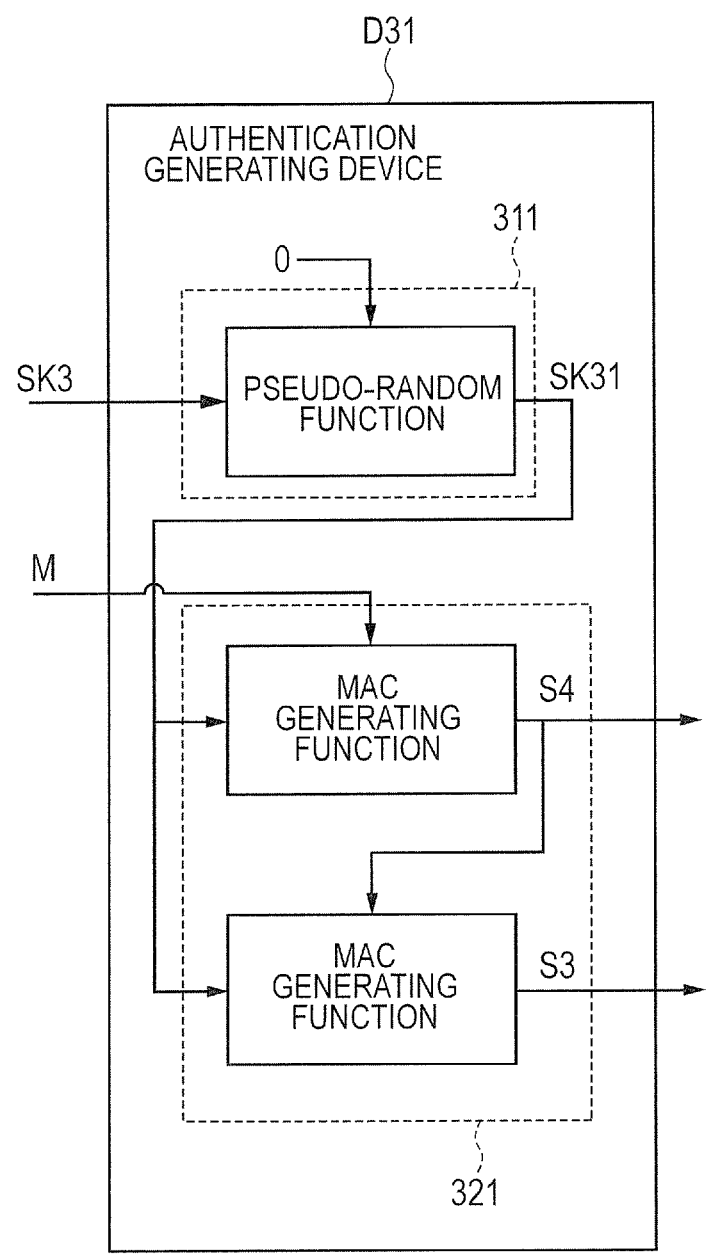
FIG. 18A is a schematic diagram illustrating the flow of processing of an authentication generating device in a communication device illustrated in FIG. 17.
Figure 18B:
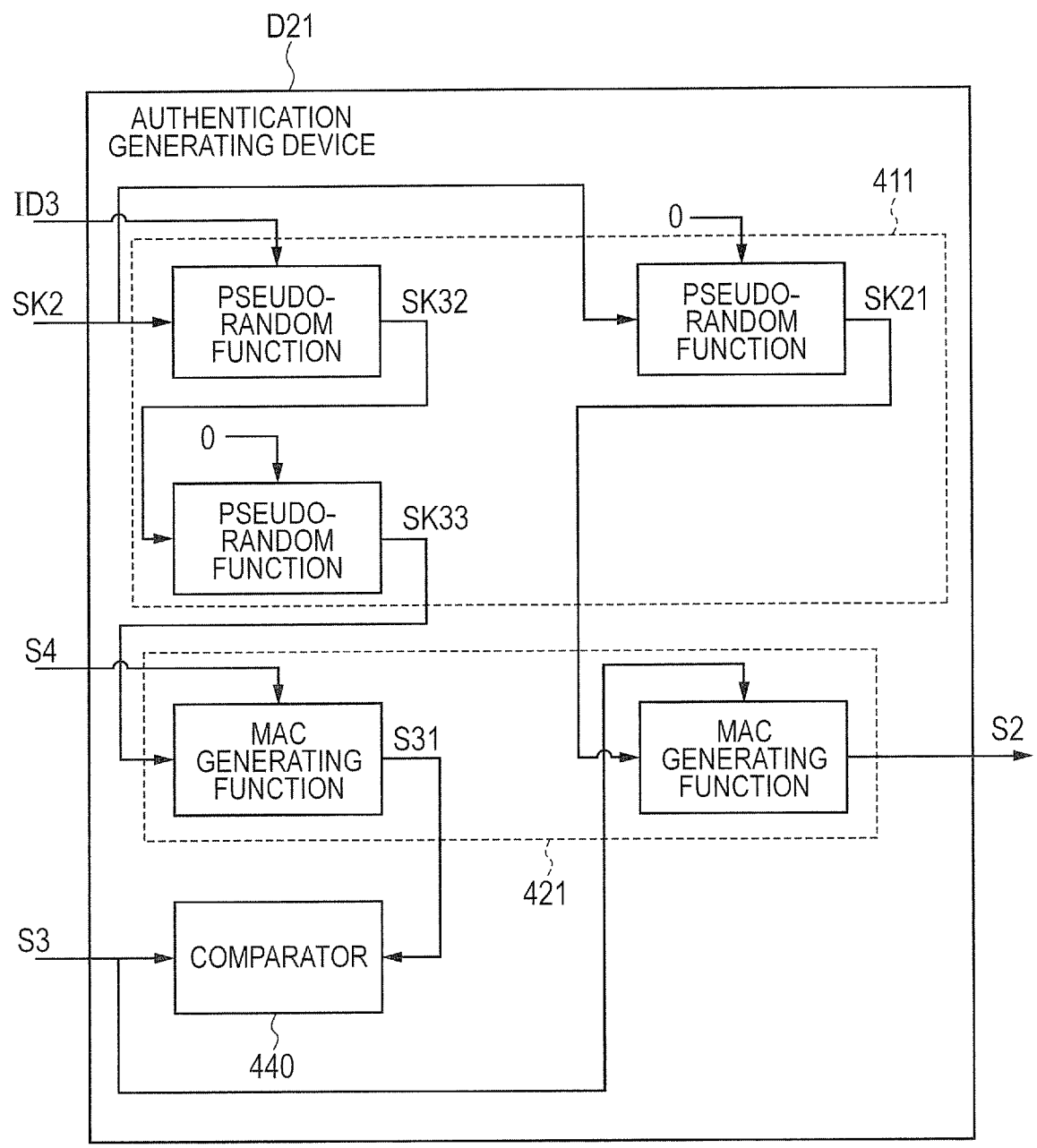
FIG. 18B is a schematic diagram illustrating the flow of processing of the authentication generating device in the communication device illustrated in FIG. 17.
Figure 18C:
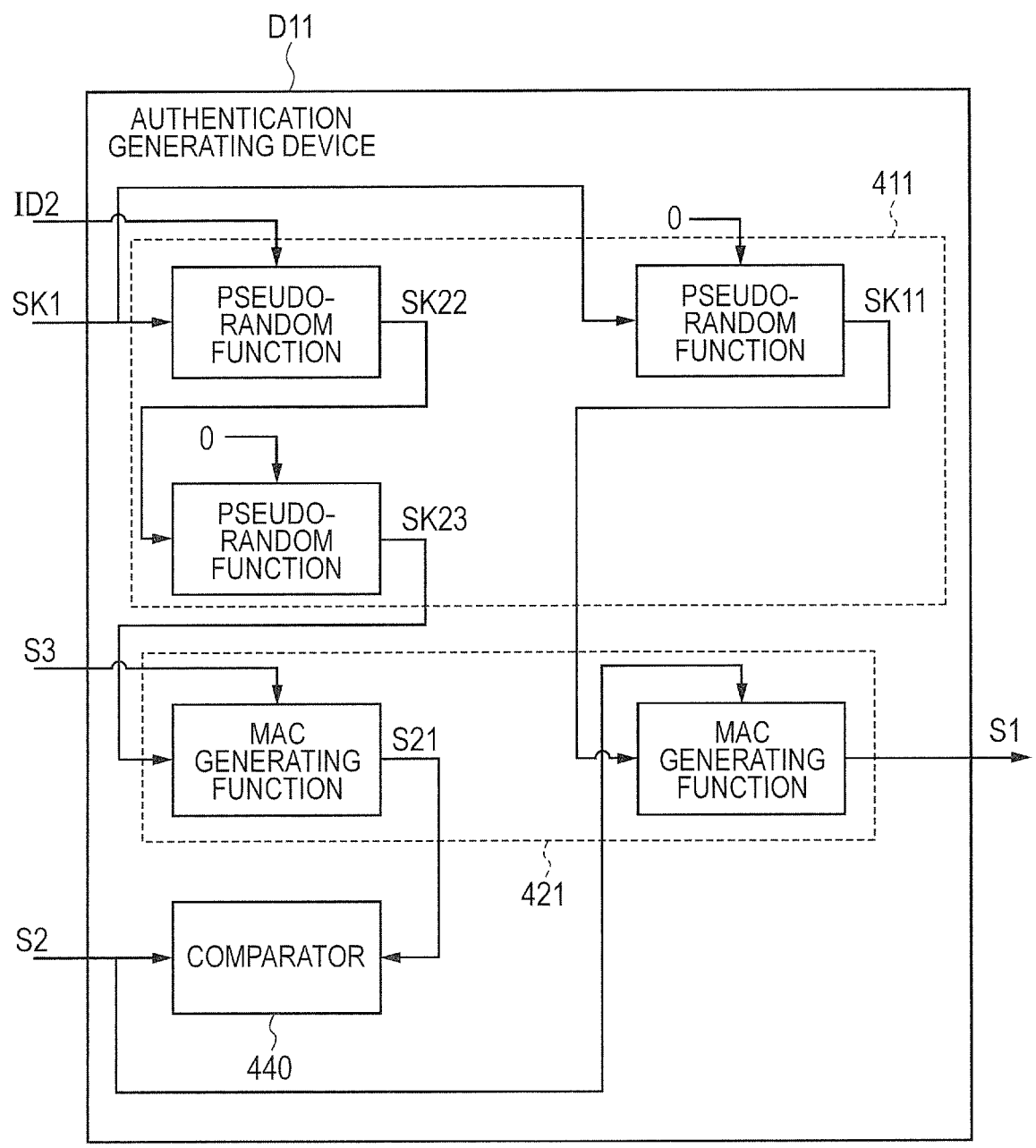
FIG. 18C is a schematic diagram illustrating the flow of processing of the authentication generating device in the communication device illustrated in FIG. 17.

Next, the transmission operation in the present embodiment is explained. FIG. 16 is a flow chart illustrating an example of the flow of the operation of transmission in the data transmission system according to Embodiment 2. FIG. 17 is a schematic diagram illustrating an information flow with a concrete example of a transmission path between the transmission source device and the repeater device. FIG. 18A, FIG. 18B, and FIG. 18C are schematic diagrams illustrating the flow of processing of the authentication generating device in the communication device illustrated in FIG. 17. FIG. 18A illustrates the authentication generating device D31, FIG. 18B illustrates the authentication generating device D21, and FIG. 18C illustrates the authentication generating device D11. Hereinafter, the flow chart illustrated in FIG. 16 is explained, referring properly to FIG. 17, FIGS. 18A, 18B, and 18C. FIG. 17 illustrates the configuration (the communication device and the authentication generating device) and the information (the local ID, the secret key, the message, and the MAC), with the same symbols used in the example illustrated in FIG. 12. On the premise of such symbols, FIG. 17 illustrates the values held by the communication devices D1, D2, and D3 after the initial setting, the input-output of the authentication generating devices, and the communication content between the nodes. The initial setting in the present embodiment is the same as that of Embodiment 1.

When the message M is transmitted, first, at Step 220 (S220), as is the case with Step 200 illustrated in FIG. 11, the communication device 100 as the transmission source device generates a MAC on the message M. For details, first, the pseudo-random function processing unit 311 of the authentication generating device 303 of the transmission source device generates a derivation key from the distributed secret key. Then, the MAC generating function processing unit 321 of the authentication generating device 303 of the transmission source device generates a MAC on the message M using the derivation key.

When explained in detail based on the examples illustrated in FIG. 17, FIGS. 18A, 18B, and 18C, at Step 220, in the authentication generating device D31 of the communication device D3, the pseudo-random function processing unit 311 generates the derivation key SK31 using the secret key SK3 and the derivation key setting value (specifically 0). Next, the MAC generating function processing unit 321 outputs the MAC value S4 using the derivation key SK31 and the message M.

After Step 220, the processing advances to Step 221 (S221). At Step 221, the communication device 100 as the transmission source device generates a MAC on the MAC generated at Step 220. When explained in detail based on the examples illustrated in FIG. 17, FIGS. 18A, 18B, and 18C, at Step 221, the MAC generating function processing unit 321 inputs the derivation key SK31 as the secret key and the MAC value S4 as the message, and outputs a MAC value S3 as the calculation result.

After Step 221, the processing advances to Step 222 (S222). At Step 222, the information is transferred to the higher-order repeater device. Specifically, the transmission source device transmits, to the higher-order repeater device, the message M, two MAC values generated by the authentication generating device 303 based on the message M, and the local ID of the transmission source device. When explained in detail according to the example, the transmitter 302 of the communication device D3 transmits (M, S4, S3, ID3) to the communication device D2.

After Step 222, the processing advances to Step 223 (S223). At Step 223, the repeater device generates a MAC on one MAC of two received MACs. For details, first, the pseudo-random function processing unit 411 of the authentication generating device 403 of the repeater device generates a secret key of the lower-order node that has transmitted the message M, from the secret key distributed to the own device. Furthermore, the pseudo-random function processing unit 411 generates a derivation key of this lower-order node from the generated secret key of the lower-order node. Then, the MAC generating function processing unit 421 of the authentication generating device 403 of the repeater device generates a MAC on one of the received MACs using the derivation key of the lower-order node.

When explained in detail according to the example, at Step 223, the communication device D2 operates as follows. The receiver 401 of the communication device D2 receives (M, S4, S3, ID3) from the communication device D3 and inputs the MAC values S4 and S3, the secret key SK2, and ID3 into the authentication generating device D21. In the authentication generating device D21, first, the pseudo-random function processing unit 411 inputs SK2 as the secret key and inputs ID3 as the message, and outputs the calculation result SK32. The SK32 corresponds to the secret key distributed to the lower-order node. Next, the pseudo-random function processing unit 411 inputs SK32 as the secret key, inputs 0 as the message, and outputs the calculation result SK33. The SK33 corresponds to the derivation key of the lower-order node. Next, the MAC generating function processing unit 421 inputs the derivation key SK33 as the secret key, inputs the MAC value S4 as the message, and outputs a MAC value S31 as the calculation result. When there is no error, the secret key SK32 agrees with the secret key SK3 of the communication device D3, the derivation key SK33 agrees with the derivation key SK31 calculated by the communication device D3, and the MAC value S31 agrees with the MAC value S3 calculated by the communication device D3.

After Step 223, the processing advances to Step 224 (S224). At Step 224, the comparator 440 of the repeater device compares the MAC generated at Step 223 with the other MAC of the two received MACs. When explained in detail according to the example, the comparator 440 compares the MAC value S31 generated at Step 223 with the received MAC value S3. When the MAC values are in agreement (Yes at Step 225 (S225)), the following processing after the step 226 is performed. However, when the MAC values are not in agreement (No at Step 225 (S225)), the repeater device terminates the processing.

At Step 226, the repeater device generates a MAC on the other MAC of the two received MACs. For details, first, the pseudo-random function processing unit 411 of the authentication generating device 403 of the repeater device generates a derivation key from the distributed secret key. Then, the MAC generating function processing unit 421 of the authentication generating device 403 of the repeater device generates a MAC on the received MAC using the derivation key.

When explained in detail according to the example, at Step 226, the communication device D2 operates as follows. In the authentication generating device D21, first, the pseudo-random function processing unit 411 inputs SK2 as the secret key, inputs 0 as the message, and generates a derivation key SK21. Next, the MAC generating function processing unit 421 inputs the derivation key SK21 as the secret key and the MAC value S3 as the message, and outputs a MAC value S2 as the calculation result.

After Step 226, when the higher-order node of the repeater device concerned is not the data receiving device (No at Step 227 (S227)), the processing returns to Step 222 and transmission of the information to another repeater device is performed. Specifically, the repeater device transmits, to the higher-order repeater device, the message M, two MAC values generated by the authentication generating device 403, the received local ID, and the local ID of the repeater device concerned. When explained in detail according to the example, the transmitter 402 of the communication device D2 transmits (M, S3, S2, {ID2, ID3}) to the communication device D1.

The communication device D1 performs the same operation as in the communication device D2. That is, the receiver 401 of the communication device D1 receives (M, S3, S2, {ID2, ID3}) from the communication device D2 and inputs the MAC values S3 and S2, the secret key SK1, and ID2 into the authentication generating device D11. In the authentication generating device D11, first, the pseudo-random function processing unit 411 inputs SK1 as the secret key, inputs ID2 as the message, and outputs the calculation result SK22. Next, the pseudo-random function processing unit 411 inputs SK22 as the secret key, inputs 0 as the message, and outputs the calculation result SK23. Next, the MAC generating function processing unit 421 inputs the derivation key SK23 as the secret key, inputs the MAC value S3 as the message, and outputs the MAC value S21 as the calculation result. Then, the comparator 440 compares the MAC value S21 with the received MAC value S2. When both are in agreement, the authentication generating device D11 calculates the derivation key SK11 using the secret key SK1 and finally generates the MAC value S1 as the MAC on the MAC value S2. When there is no error, the secret key SK22 agrees with the secret key SK2 of the communication device D3, the derivation key SK23 agrees with the derivation key SK21 calculated by the communication device D3, and the MAC value S21 agrees with the MAC value S2 calculated by the communication device D3.

When the higher-order node of the repeater device is a data receiving device (Yes at Step 227), the processing shifts to Step 228. At Step 228 (S228), the repeater device transfers the information to the data receiving device. Specifically, the repeater device transmits, to the data receiving device, the message M, two MAC values generated by the authentication generating device 403, the received local ID, and the local ID of the repeater device concerned. When explained in detail according to the example, the transmitter 402 of the communication device D1 transmits (M, S2, S1, {ID1, ID2, ID3}) to the communication device 100 as the data receiving device. The communication device D1 may not transmit S2. In the above, the transmission operation in Embodiment 2 is explained. The verification operation in the data receiving device is the same as in Embodiment 1. Therefore, when explained based on the example described above, the data receiving device performs the verification processing according to the flow illustrated in FIG. 14, using (M, S1, {ID1, ID2, ID3}) received from the communication device D1.

In the above, Embodiment 2 is explained. Embodiment 2 adopts the configuration in which the repeater device can perform the verification of the MAC value transmitted from the lower-order node. Then, as described above, when the comparator 440 determines that the first MAC and the MAC on the second MAC are in agreement, the MAC generating function processing controller 422 of the repeater device performs control to generate a MAC on the first MAC, by inputting the first MAC and the secret key unique to the repeater device concerned, into the MAC generating function processing unit 421. In other words, when the comparator 440 determines that the MACs are not in agreement, the MAC generating function processing controller 422 of the repeater device does not perform the processing to generate the MAC on the first MAC. Therefore, it is possible to suppress the processing load in the data transmission system.

When the comparator 440 determines that the first MAC and the MAC on the second MAC are in agreement, the transmitter 402 of the repeater device transmits, to the higher-order communication device 100, the data of the transmission target, the first MAC, the MAC on the first MAC, the local ID of the repeater device concerned, and the local ID received by the receiver 401. In other words, when the comparator 440 determines that the MACs are not in agreement, the MAC generating function processing controller 422 of the repeater device does not perform transmission to the higher-order node. Therefore, it is possible to suppress the traffic in the data transmission system. In the present embodiment, when the comparator 440 determines that the MACs are not in agreement, both of the generation of the MAC and the transmission to the higher-order node are suppressed. However, only the transmission to the higher-order node may be suppressed.

The transmission source device performs the MAC generation twice and generates two MACs. Therefore, it is possible for the repeater device to perform the verification, without inputting the message M as the data of the transmission target into the authentication generating device 405. Accordingly, the computation time by the authentication generating device 405 of the repeater device does not depend on the length of the message M, and it is possible to estimate the computation time of the authentication generating device 405 in advance. Therefore, if the transmission interval of the data transmitted from the lower-order node is decided, it is possible to estimate in advance the maximum connection number of the lower-order nodes that can perform the data transmit and receive, without causing system delay.

Also in the present embodiment, the repeater device may generate the secret key. That is, in the present embodiment, the repeater device may include the key generating device 404. Also in the present embodiment, the derivation key may not be used. That is, the MAC may be generated using the distributed secret key. It is possible to realize such a configuration by omitting the processing regarding the generation of the derivation key in the data transmission system described above.

Embodiment 3

Next, Embodiment 3 is explained. According to Embodiment 1, the data of the transmission target is transmitted in plaintext. As opposed to this, in a data transmission system according to Embodiment 3, the data of the transmission target is encrypted and transmitted. Accordingly, in Embodiment 3, data can be transmitted more safely. Hereinafter, different points from Embodiment 1 are explained.

Figure 19:
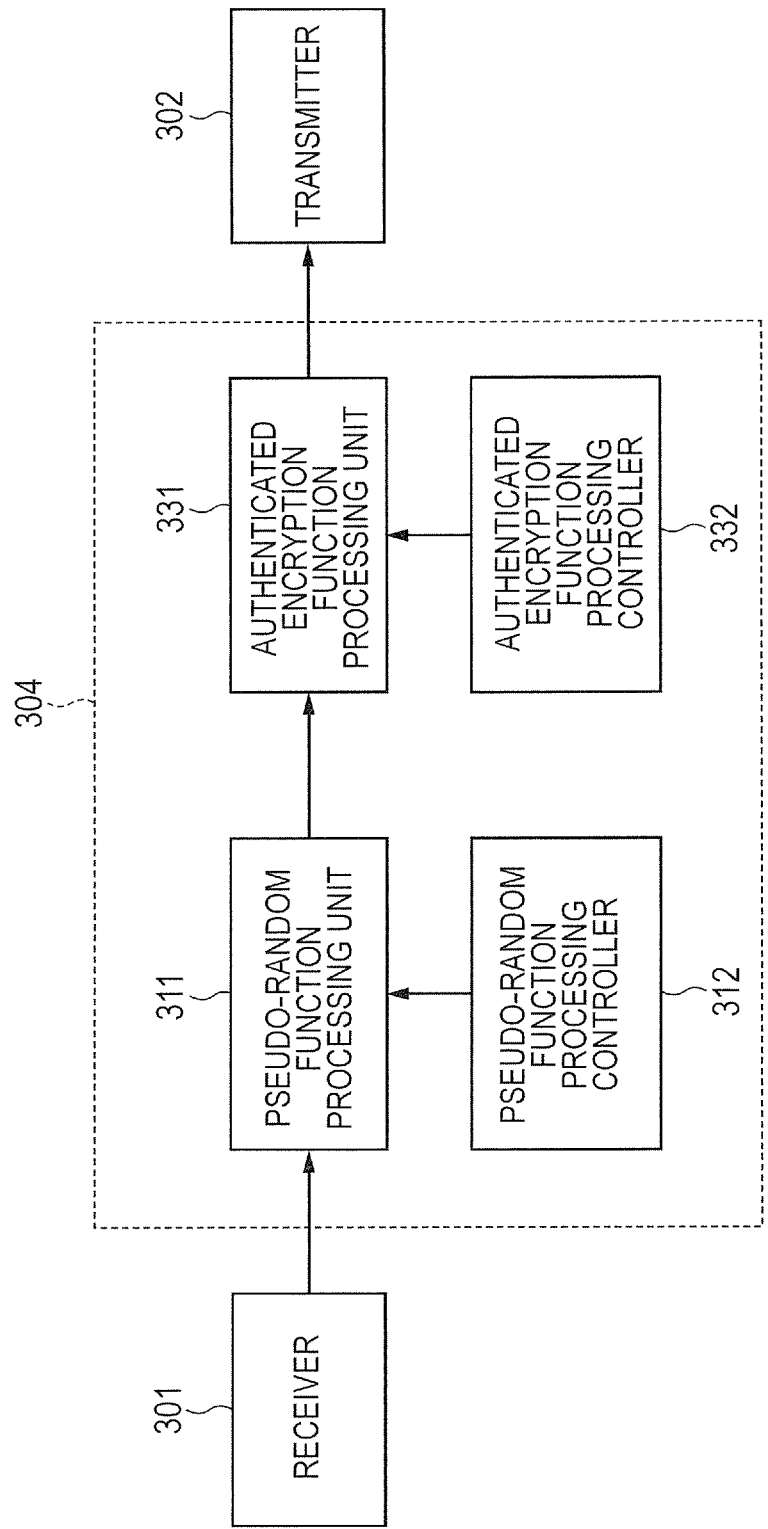
FIG. 19 is a block diagram illustrating an example of the configuration of a transmission source device according to Embodiment 3.

FIG. 19 is a block diagram illustrating an example of the configuration of a transmission source device according to Embodiment 3. The communication device 100 as the transmission source device has a different configuration from that illustrated in FIG. 4 in that the authentication generating device 303 is replaced with an encryption device 304. The encryption device 304 is different from the authentication generating device 303 in that an authenticated encryption function processing unit 331 and an authenticated encryption function processing controller 332 are included, instead of the MAC generating function processing unit 321 and the MAC generating function processing controller 322. The encryption device 304 generates ciphertext and a MAC as is described in the following. Therefore, the encryption device 304 may be called an authentication generating device.

The authenticated encryption function processing unit 331 generates and encrypts a MAC, by performing arithmetic with the use of a predetermined authenticated encryption function. The authenticated encryption function processing controller 332 performs control to generate a MAC on the data of the transmission target and to encrypt the data of the transmission target, by inputting into the authenticated encryption function processing unit 331 the data of the transmission target and the secret key unique to the transmission source device. The authenticated encryption function processing controller 332 inputs into the authenticated encryption function processing unit 331 the secret key (derivation key) generated by the pseudo-random function processing unit 311 as the secret key unique to the transmission source device.

In the present embodiment, the transmitter 302 of the transmission source device transmits, to the repeater device, the data encrypted by the authenticated encryption function processing unit 331, the MAC generated by the authenticated encryption function processing unit 331, and the local ID of the transmission source device concerned.

Therefore, the receiver 401 of the repeater device according to the present embodiment receives the encrypted data, the MAC, and the local ID of the communication device 100. Then, the transmitter 402 of the repeater device transmits, to another repeater device or the data receiving device, the encrypted data received by the receiver 401, the MAC generated by the MAC generating function processing unit 421, the MAC generated by the transmission source device, the local ID of the repeater device concerned, and the local ID received by the receiver 401.

Figure 20:
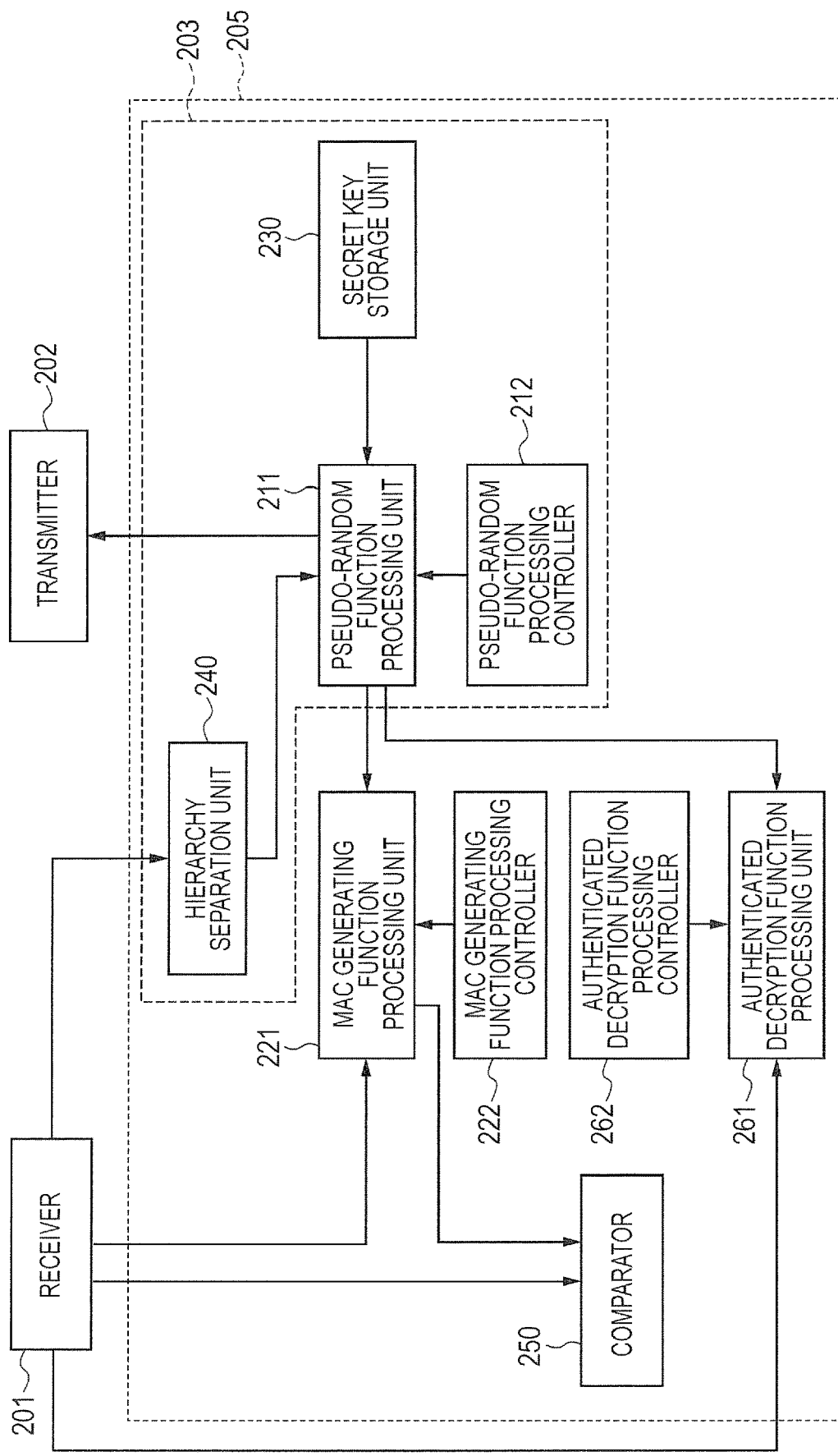
FIG. 20 is a block diagram illustrating an example of the configuration of a data receiving device according to Embodiment 3.

Next, the data receiving device according to Embodiment 3 is explained. FIG. 20 is a block diagram illustrating an example of the configuration of the data receiving device according to Embodiment 3. The communication device 100 as the data receiving device has a different configuration from the one illustrated in FIG. 6 in that the verification device 204 is replaced with a verification device 205. The verification device 205 is different from the verification device 204 in that an authenticated decryption function processing unit 261 and an authenticated decryption function processing controller 262 are added.

The authenticated decryption function processing unit 261 performs arithmetic with the use of a predetermined authenticated decryption function, to generate the decrypted data. The authenticated decryption function processing controller 262 performs control to generate the decrypted data, by inputting into the authenticated decryption function processing unit 261 the secret key corresponding to the local ID extracted from the communication device 100 of the N-th hierarchy, the encrypted data received by the receiver 201, and the MAC generated by the transmission source device and received by the receiver 201. The receiver 201 according to the present embodiment receives the encrypted data, the list of the local IDs, the MAC generated by the repeater device, and the MAC generated by the transmission source device, via the repeater device. However, in a precise sense, the MAC generated by the transmission source device and received by the receiver 201 is the MAC that is estimated to be generated by the transmission source device, and when injustice such as falsification is performed, it is different from the MAC generated by the transmission source device.

The predetermined authenticated encryption function and the predetermined authenticated decryption function described above may be a function formed by a cryptography use mode, such as the GCM mode or the CCM mode, or may be a function formed by combining encryption and MAC such as the Encrypt-Then-MAC method, or may be an exclusive-use function formed by the algorithm that has applied for the CAESAR competition.

The MAC generating function processing controller 222 according to the present embodiment performs control to derive the MAC, by inputting into the MAC generating function processing unit 221 the MAC generated by the transmission source device and received by the receiver 201 and the secret key corresponding to the extracted local ID of the communication device 100 of the (N−1)-th hierarchy. The MAC generating function processing controller 222 performs control to derive the MAC recursively, by inputting into the MAC generating function processing unit 221 the MAC derived thereby and the secret key corresponding to the extracted local ID of the communication device 100 of the m-th hierarchy (m is a positive integer between 1 and N−2 inclusive).

That is, the MAC generating function processing controller 222 reproduces the MAC generated by the communication device 100 of the (N−1)-th hierarchy, by using the MAC generated by the transmission source device and the secret key (specifically, the true secret key as a key corresponding to the derivation key) corresponding to the communication device 100 of the (N−1)-th hierarchy and generated by the pseudo-random function processing unit 211. Subsequently, the MAC generating function processing controller 222 performs control to repeat the reproducing processing of the MAC generated by the communication device 100 of the m-th hierarchy, by using the reproduced MAC on the communication device 100 of the (m+1)-th hierarchy and the secret key (specifically, the true secret key as a key corresponding to the derivation key) corresponding to the communication device 100 of the m-th hierarchy.

Accordingly, the MAC generating function processing controller 222 performs control to generate the MAC corresponding to each communication device 100 from the (N−1)-th hierarchy to the first hierarchy.

Then, the comparator 250 compares the MAC generated by the repeater device and received by the receiver 201 with the MAC corresponding to the communication device 100 of the first hierarchy and generated by the MAC generating function processing unit 221. As is the case with the above-described Embodiments, when the right data has been transmitted along the right path, two MACs are in agreement, however, when the data has been falsified or the data has not been transmitted along the right path, two MACs are not in agreement.

Figure 21:
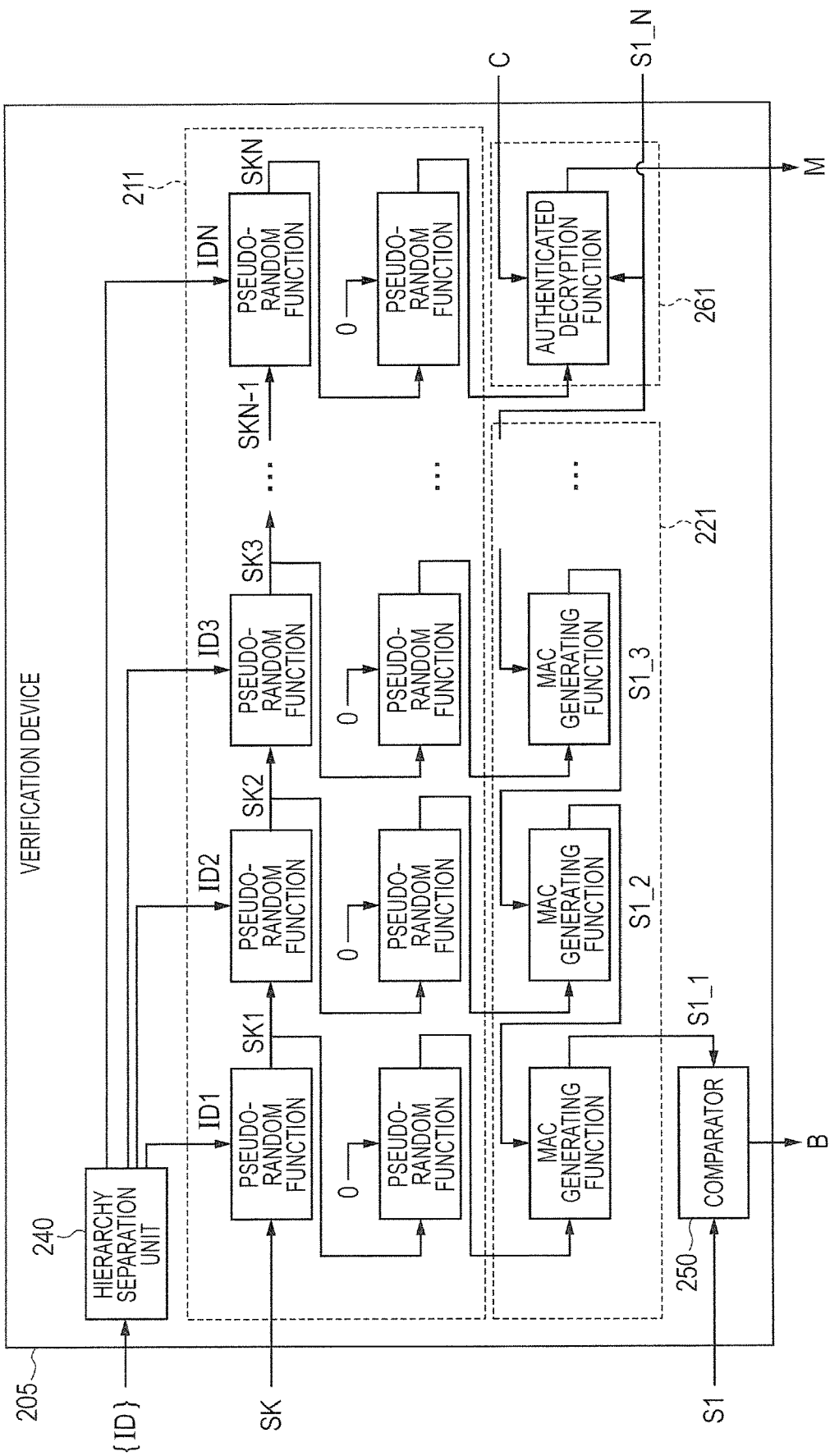
FIG. 21 is a schematic diagram illustrating the flow of processing in the verification device according to Embodiment 3.

FIG. 21 is a schematic diagram illustrating the flow of the above-described processing in the verification device 205.

As is the case with the flow of the processing illustrated in FIG. 8, also in the present embodiment, first, the secret key is generated by the pseudo-random function, then, the generated key is inputted into the pseudo-random function with the derivation key setting value (0 in the example illustrated in FIG. 21). Accordingly, the derivation keys are generated. Among these, the derivation key corresponding to the local ID of the communication device of the N-th hierarchy is inputted into the authenticated decryption function, and the derivation key corresponding to the local ID of the communication device from the (N−1)-th hierarchy to the first hierarchy is inputted into the MAC generating function. In FIG. 21, C indicates the transmitted ciphertext, that is, the encrypted data. S1_1, S1_2, . . . , S1_N−1 indicate MACs outputted by the MAC generating function processing unit 221, and S1_N indicates the MAC generated by the transmission source device (the communication device 100 of the N-th hierarchy) and transmitted. S1 indicates the MAC generated by the repeater device (the communication device 100 of the first hierarchy) and transmitted. The other symbols are the same as those of FIG. 8. As illustrated in FIG. 21, the verification device 205 decrypts the received ciphertext C by the authenticated decryption function processing unit 261, and generates the message M that is the data before encryption. The verification device 205 reproduces the authentication generating performed when the data is transmitted from the transmission source device to the data receiving device, and generates the MAC. Then, the verification device 205 verifies whether the right data is received and whether the data is transmitted along the right path, by comparing the generated MAC with the received MAC.

Figure 22:
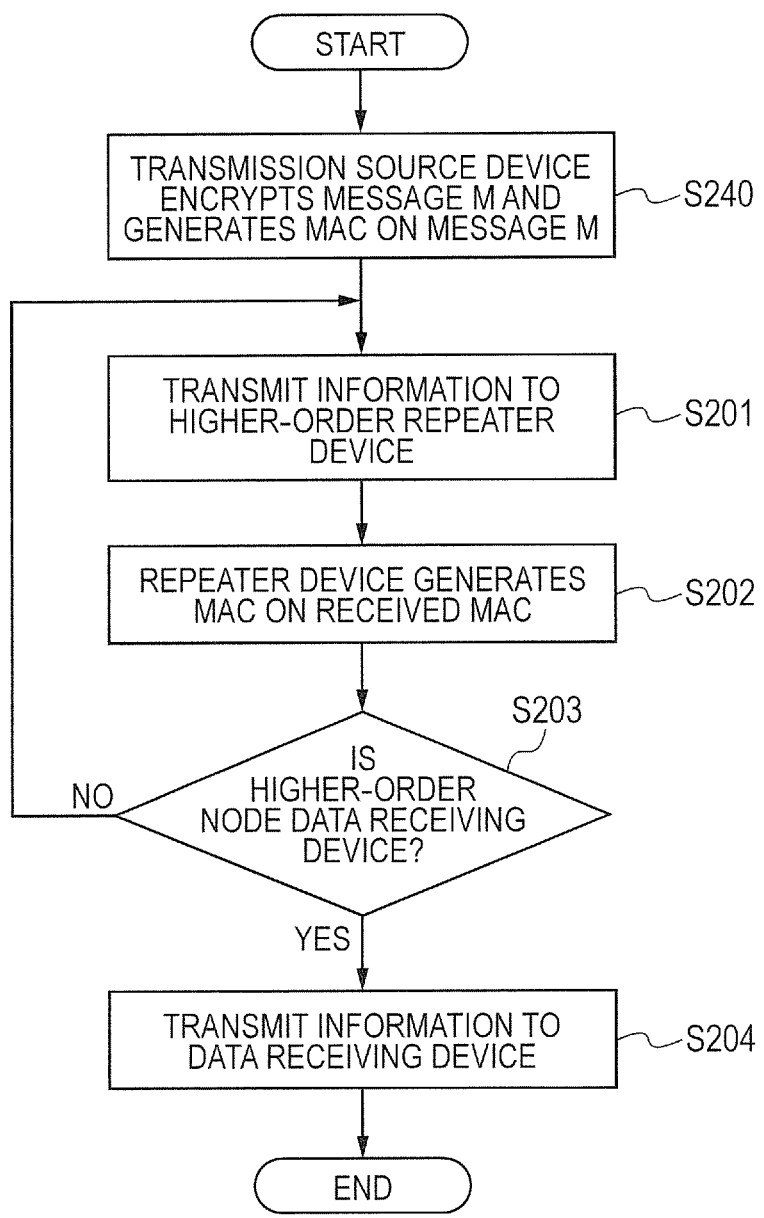
FIG. 22 is a flow chart illustrating an example of the flow of operation of transmission in a data transmission system according to Embodiment 3.
Figure 23:
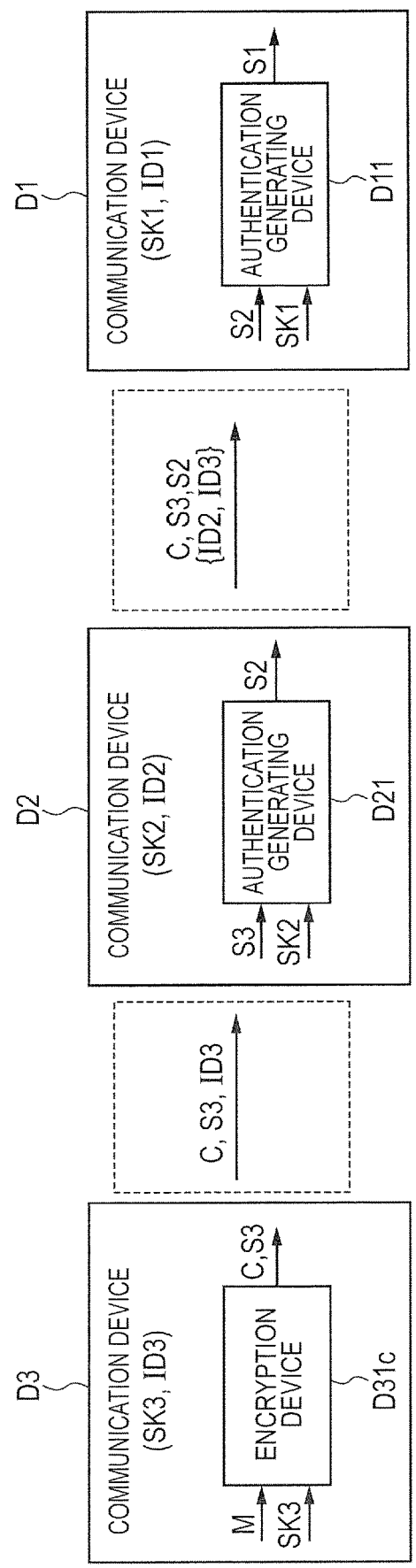
FIG. 23 is a schematic diagram illustrating an information flow with a concrete example of a transmission path in a transmission source device and a repeater device.
Figure 24:
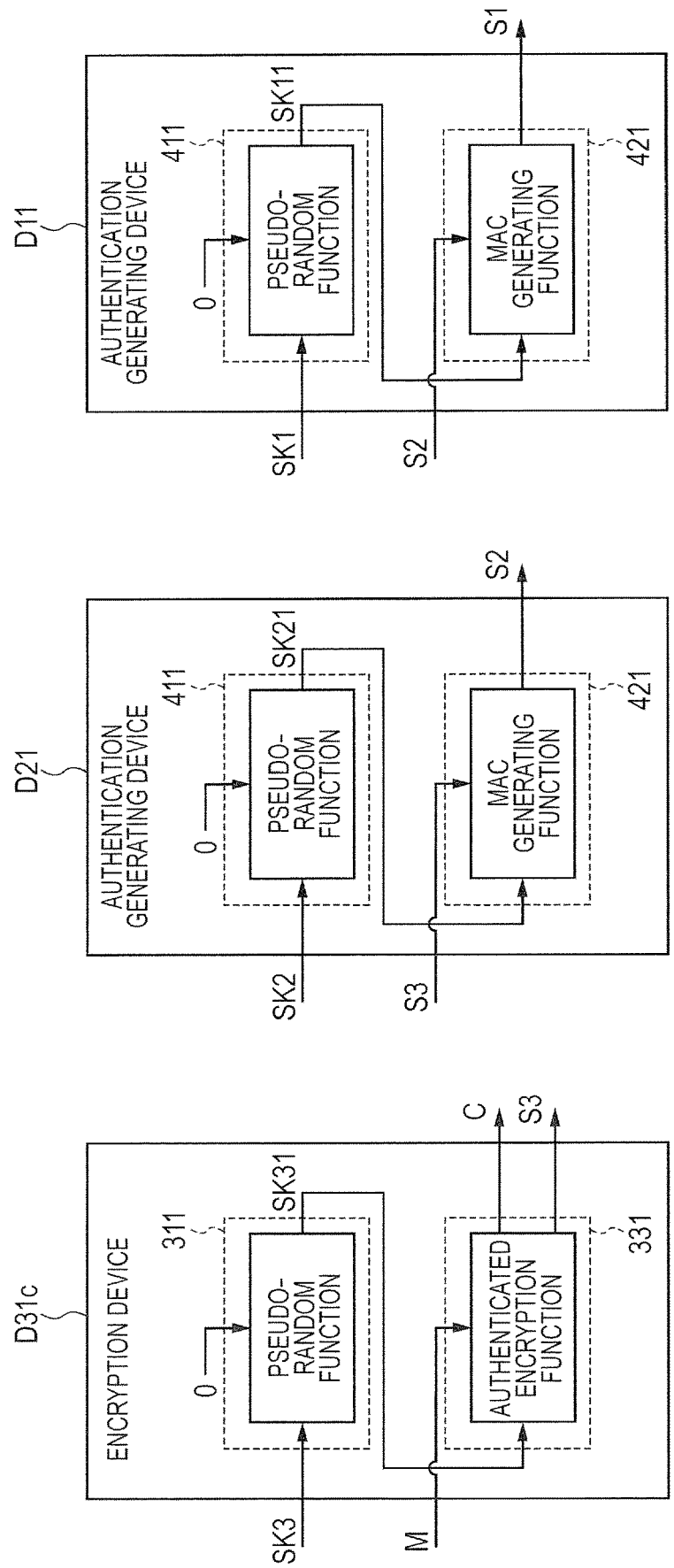
FIG. 24 is a schematic diagram illustrating the flow of processing of an encryption device and an authentication generating device in each communication device illustrated in FIG. 23.

Next, the operation of the data transmission system according to Embodiment 3 is explained. The operation about the initial setting according to the present embodiment is the same as that of Embodiment 1. Therefore, the explanation thereof is omitted. FIG. 22 is a flow chart illustrating an example of the flow of the operation of transmission in the data transmission system according to Embodiment 3. As illustrated in FIG. 22, the flow chart of the operation of transmission in the present embodiment is different from the flow chart illustrated in FIG. 11 in that Step 200 is replaced with Step 240. FIG. 23 is a schematic diagram illustrating an information flow with a concrete example of a transmission path between the transmission source device and the repeater device. FIG. 24 is a schematic diagram illustrating the flow of processing of the encryption device and the authentication generating device in each communication device illustrated in FIG. 23. Hereinafter, the flow chart illustrated in FIG. 22 is explained, properly referring to FIG. 23 and FIG. 24.

FIG. 23 illustrates the configuration (the communication device and the authentication generating device) and the information (the local ID, the secret key, the message, and the MAC), with the same symbols used in the example illustrated in FIG. 12. In FIG. 12, the authentication generating device D31 is shown in the communication device D3. However, in the present embodiment, the transmission source device includes the encryption device as described above. Therefore, in FIG. 23, an encryption device D31c is shown in the communication device D3. On the premise of such symbols, FIG. 23 illustrates the values held by the communication devices D1, D2, and D3 after the initial setting, the input-output of the encryption device or the authentication generating device, and the communication content between the nodes.

When the message M is transmitted, first, at Step 240 (S240), the authenticated encryption function processing unit 331 of the communication device 100 as the transmission source device generates ciphertext C that is obtained by encrypting the message M, and generates a MAC on the message M. For details, first, the pseudo-random function processing unit 311 of the encryption device 304 of the transmission source device generates a derivation key from the distributed secret key. Then, the authenticated encryption function processing unit 331 of the encryption device 304 of the transmission source device generates the ciphertext and the MAC on the message M using the derivation key.

When explained in detail based on the examples illustrated in FIG. 23 and FIG. 24, at Step 240, in the encryption device D31c of the communication device D3, the pseudo-random function processing unit 311 generates the derivation key SK31 using the secret key SK3 and the derivation key setting value (specifically, 0). Next, the authenticated encryption function processing unit 331 outputs the ciphertext C and the MAC value S3 using the derivation key SK31 and the message M.

After Step 240, the processing at Step 201 and the subsequent steps is performed as is the case with Embodiment 1. However, different from Embodiment 1, the ciphertext C and the MAC generated by the transmission source device are transmitted up to the data receiving device, instead of the message M as the plaintext. Therefore, the transmitter 302 of the communication device D3 transmits (C, S3, ID3) to the communication device D2, and the transmitter 402 of the communication device D2 transmits ({C, S3}, S2, {ID2, ID3}) to the communication device D1. The transmitter 402 of the communication device D1 transmits ({C, S3}, S1, {ID1, ID2, ID3}) to the communication device 100 as the data receiving device.

Figure 25:
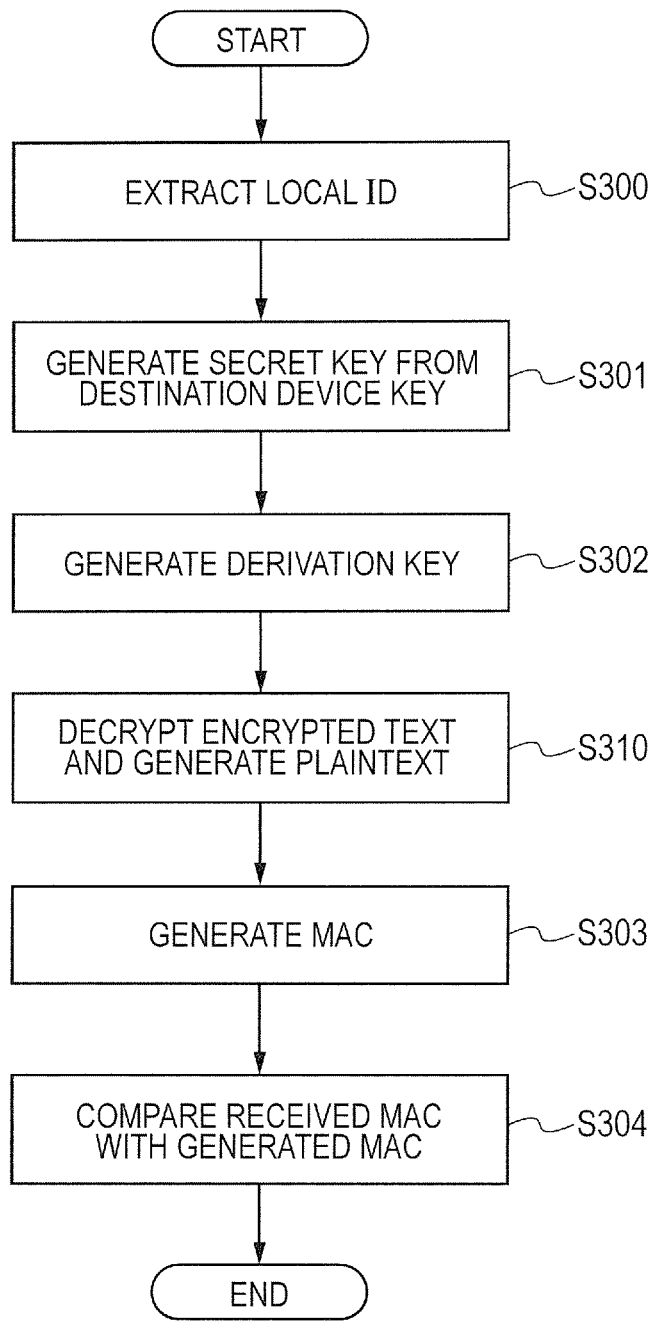
FIG. 25 is a flow chart illustrating an example of the flow of verification operation in the data receiving device according to Embodiment 3.

Next, the verification operation in the data receiving device according to the present embodiment is explained. FIG. 25 is a flow chart illustrating an example of the flow of the verification operation in the data receiving device according to Embodiment 3. As illustrated in FIG. 25, the flow chart of the verification operation in the present embodiment is different from the flow chart illustrated in FIG. 14 in that Step 310 is inserted between Step 302 and Step 303. When the receiver 201 receives the information including the ciphertext C from the repeater device, the data receiving device according to Embodiment 3 performs the verification processing by the verification device 205, as shown in the following.

First, as is the case with Embodiment 1, processing from Step 300 to Step 302 is performed. That is, as is the case with Embodiment 1, the derivation key $SKi\_1'$ ($1 \leq i \leq N$) is generated. After Step 302, the processing shifts to Step 310.

At Step 310 (S310), the authenticated decryption function processing unit 261 and the authenticated decryption function processing controller 262 decrypt the ciphertext, using the MAC generated by the transmission source device and received by the receiver 201, the ciphertext received by the receiver 201, and the derivation key corresponding to the communication device 100 of the N-th hierarchy and generated at Step 302. Specifically, the authenticated decryption function processing controller 262 inputs, into the authenticated decryption function processing unit 261, $SKN\_1'$ as the secret key, C as the ciphertext, and $S1\_N$ as the MAC value, and generates the plaintext M. $S1\_N$ is the MAC generated by the transmission source device (the communication device 100 of the N-th hierarchy) and received by the receiver 201. When the verification of the MAC value by the authenticated decryption function is not successful, the output of the authenticated decryption function processing unit 261 becomes false. On the other hand, when the verification is successful, the right plaintext M is outputted from the authenticated decryption function processing unit 261. The plaintext M generated by the authenticated decryption function processing unit 261 is outputted from the verification device 205.

After Step 310, the processing shifts to Step 303. At Step 303 in the present embodiment, the MAC generating function processing unit 221 and the MAC generating function processing controller 222 generate the MAC using the MAC generated by the transmission source device and received, and the derivation key generated at Step 302. Specifically, the MAC generating function processing unit 221 and the MAC generating function processing controller 222 execute the following for i of $N-1 \geq i \geq 1$. The MAC generating function processing controller 222 inputs $SKi\_1'$ as the secret key and $S1\_i+1$ as the message into the MAC generating function processing unit 221, and obtains $S1\_i$. When the message transmission is performed correctly, each value from $S1\_N-1$ to $S1\_1$ generated at this time is in agreement with the MAC value generated by the communication device 100 of each hierarchy from the data receiving device to the transmission source device.

Next, at Step 304, the comparator 250 compares the MAC generated by the repeater device and received by the receiver 201 with the MAC corresponding to the communication device 100 of the first hierarchy and generated at Step 303. Specifically, the comparator 250 compares $S1\_1$ generated at Step 303 with the received S1, and determines whether both values are in agreement. The comparator 250 outputs the output value B=1 when both are in agreement, otherwise, outputs the output value B=0. Also in the present embodiment, when B=1, it means that the message M has been transmitted without falsification and along the right transmission path from the transmission source device. When B=0, it means that the message M has been falsified or has been transmitted via a communication device other than the communication device in the right transmission path. The data receiving device may include a determination unit (not shown) that determines the safety of transmission, based on the output value of the comparator 250 and the output value of the authenticated decryption function processing unit 261. This determination unit may determine that the message has been encrypted correctly and sent when the output value of the authenticated decryption function processing unit 261 is not a false, and may determine that the message has been transmitted via the right transmission path when the output of the comparator 250 is B=1.

In the above, Embodiment 3 is explained. In the present embodiment, the encrypted data is transmitted. Therefore, the data can be transmitted more safely. Accordingly, in the case of using the sensor networks that require the secrecy of data and in the case of transmitting the message accompanied by personal information, for example, it is possible to perform the transmission with the guaranteed secrecy.

The configuration according to Embodiment 3 may be combined with the configuration according to Embodiment 2. That is, the configuration for transmitting the encrypted data and the configuration for performing verification by the repeater device may be combined. Also in Embodiment 3, the repeater device may generate the secret key. That is, in Embodiment 3, the repeater device may include the key generating device 404. In the configuration according to Embodiment 3, the MAC is generated using the derivation key. However, the derivation key may not be generated. That is, the MAC may be generated using the distributed secret key.

In the Embodiments, each element described in the drawings as a functional block that performs various kinds of processing can be configured hardware-wise by a CPU, a memory, and other circuits and can be realized software-wise by a program that is loaded to the memory. Therefore, it is understood by the person skilled in the art that these functional blocks can be realized by hardware alone, by software alone, or by those combination, in various forms, not being restricted to one. That is, in the key generating devices 203 and 404, the verification devices 204 and 205, the authentication generating devices 303, 403, and 405, and the encryption device 304, a part or all of the functional blocks that configure the device may be realized by executing the program loaded to the memory by the CPU, and may be realized by a dedicated hardware circuit. The circuit that performs the function process may be comprised of the existing circuits, such as the common key encryption AES and the Hash function SHA2, mounted in the semiconductor product as hardware.

The program described above is stored using various types of non-transitory computer readable media, and can be supplied to the computer. The non-transitory computer readable media include various types of tangible storage media. The example of the non-transitory computer readable media includes a magnetic recording medium (for example, a flexible disk, a magnetic tape, a hard disk drive), an optical magnetic recording medium (for example, a magneto-optical disk), a CD-ROM (Read Only Memory), a CD-R, a CD-R/W, and a semiconductor memory (for example, a mask ROM, a PROM (Programmable ROM), an EPROM (Erasable PROM), a flash ROM, a RAM (Random Access Memory)). The program may be supplied to the computer by means of various types of transitory computer readable media. The example of the transitory computer readable medium includes an electrical signal, a light signal, and electromagnetic waves. The transitory computer readable medium can supply the program to the computer via a wired communication path of an electric wire, an optical fiber, etc., or a wireless communication path.

As described above, the invention accomplished by the present inventors has been concretely explained based on the embodiments. However, it cannot be overemphasized that the present invention is not restricted to the embodiments as described above, and it can be changed variously in the range that does not deviate from the gist. It is needless to say that the communication device operating as the repeater device, for example, may operate as the transmission source device. In this case, the communication device concerned includes the function as the repeater device and the function as the transmission source device.

What is claimed is:

1. A data receiving device comprising:
a memory that stores a destination device key as a secret key determined in advance;
a receiving unit that receives:
   data;
   list of individual identifiers, wherein the individual identifiers correspond to communication devices, respectively, wherein the communication devices are located in a first hierarchy to an N-th hierarchy, respectively, and wherein N is an integer of three or more; and
   a MAC (Message Authentication Code) generated by each of the communication devices in the first hierarchy to an (N−1)-th hierarchy,
   wherein the communication device in the N-th hierarchy is a transmission source device being a transmission source of the data,
   wherein the communication devices in the first hierarchy to the (N−1)-th hierarchy are repeater devices that relay the transmission of the data such that the receiving unit receives the data, the list, and the MAC via the communication device in the first hierarchy; and
a central processing unit (CPU) that:
   extracts, from the list received by the receiving unit, an individual identifier of each of the communication devices in the first hierarchy to the N-th hierarchy in a transmission path of the data;
   generates a secret key corresponding to the individual identifier of each of the communication devices from the first hierarchy to the N-th hierarchy by 1) deriving a first secret key by performing a predetermined pseudo-random function using i) the destination device key and ii) the extracted individual identifier of the communication device of the first hierarchy and 2) deriving of a k-th secret key by performing the predetermined pseudo-random function using i) a (k−1)-th secret key derived using an individual identifier of a communication device in a (k−1)-th hierarchy and ii) are individual identifier of a communication device in a k-th hierarchy such that a second secret key is derived by performing the predetermined pseudo-random function using i) the derived first secret key and ii) the extracted individual identifier of the communication device of a second hierarchy wherein k is a positive integer from 2 to N;
   generates a MAC corresponding to each of the communication devices from the N-th hierarchy to the first hierarchy by 1) deriving an N-th MAC by performing a predetermined MAC generating function using i) the data received by the receiving unit and ii) a N-th secret key corresponding to the extracted individual identifier of the communication device in the N-th hierarchy and 2) deriving an m-th MAC by performing the predetermined MAC generating function using i) an (m+1)-th MAC derived using an individual identifier of a communication device in a (m+1)-th hierarchy and ii) a secret key corresponding to an individual identifier of a communication device in an m-th hierarchy such that a (N−1)-th MAC is derived by performing, the predetermined MAC generating function using i) the derived N-th MAC and ii) an (N−1)-th secret key corresponding to the extracted individual identifier of the communication device in the (N−1)-th hierarchy, wherein m is a positive integer from N−1 to 1; and
   compares the MAC received by the receiving unit with the MAC corresponding to the communication device in the first hierarchy generated by the CPU.

2. The data receiving device according to claim 1, wherein the CPU generates a true secret key corresponding to the individual identifier of each of the communication devices from the first hierarchy to the N-th hierarchy, by 1) deriving a first true secret key by performing the predetermined pseudo-random function using the first secret key and a predetermined value and 2) deriving a k-th true secret key by performing the pseudo-random function using the k-th secret key and the predetermined value,
   wherein the CPU uses the true secret key as the secret key corresponding to the extracted individual identifier, and wherein a value of the individual identifier is different from the predetermined value.

3. The data receiving device according to claim 1,
wherein the CPU extracts the individual identifier of each of the communication devices in the first hierarchy to the N-th hierarchy in the transmission path, from a hierarchical identifier of each of the communication devices as a distribution target of the secret key,
wherein the hierarchical identifier is an identifier uniquely associated with each of the communication devices, the hierarchical identifier being comprised of a combination of 1) the individual identifier of the communication device associated with the hierarchical identifier and 2) an individual identifier of each of one or more other communication devices in a predetermined data transmission path, and
wherein the CPU further generates a secret key of the communication device in the N-th hierarchy as the distribution target of the secret key by 1) deriving a first secret key of the communication device in the first hierarchy by performing the predetermined pseudo-random function using the destination device key and the extracted individual identifier of the communication device in the first hierarchy and 2) deriving a k-th secret key of a communication device in a k-th hierarchy by performing the predetermined pseudo-random function using i) a (k−1)-th secret key derived using an individual identifier of a communication device in a (k−1)-th hierarchy and ii) an individual identifier of a communication device in a k-th hierarchy such that a second secret key is derived by performing the predetermined pseudo-random function using i) the derived first secret key and ii) the extracted individual identifier of the communication device in the second hierarchy, wherein k is a positive integer from 2 to N.

4. The data receiving device according to claim 1,
wherein the receiving unit receives encrypted data, the list, the MAC generated by each of the communication devices in the first hierarchy to the (N−1)-th hierarchy, and the MAC generated by the communication device of the N-th hierarchy, via the communication device in the first hierarchy,
wherein the CPU
decrypts the encrypted data to generate the data by performing a predetermined authenticated decryption function using the secret key corresponding to the extracted individual identifier of the communication device of the N-th hierarchy, the encrypted data, and the MAC generated by the communication device of the N-th hierarchy,
generates a MAC corresponding to each of the communication devices from the (N−1)-th hierarchy to the first hierarchy by 1) deriving an (n−1)-th MAC by performing the predetermined MAC generating function using i) the MAC generated by the communication device of the N-th hierarchy and ii) the secret key derived using the extracted individual identifier of the communication device in the (N−1)-th hierarchy and 2) deriving an m-th MAC by performing the predetermined MAC generating function using the derived (m+1)-th MAC and the secret key derived using the extracted individual identifier of the communication device of the m-th hierarchy, wherein m is a positive integer from N−2 to 1; and compares the MAC generated by the communication device using the MAC corresponding to the communication device in the first hierarchy.

5. A data transmission system comprising:
a transmission source device as a communication device of an N-th hierarchy, the transmission source device being a transmission source of data;
two or more repeater devices as two or more communication devices of a first hierarchy to an (N−1)-th hierarchy, respectively, the two or more repeater devices relay the transmission of the data; and
a data receiving device that receives the data via the two or more repeater devices,
wherein the transmission source device being the communication device of the N-th hierarchy comprises:
a first central processing unit (CPU) that generates a MAC (Message Authentication Code) on the data by performing a predetermined MAC generating function using the data and a secret key unique to the transmission source device; and
a first transmitting unit that transmits to a communication device of the (N−1)-th hierarchy the data, the MAC generated by the first CPU, and an individual identifier of the transmission source device,
wherein the secret key unique to the transmission source device is a secret key derived by performing a predetermined pseudo-random function,
wherein each of the two or more communication devices in the first hierarchy to the (N−1)-th hierarchy comprises:
a first receiving unit that receives, from a communication device in a hierarchy that is one closer to the N-th hierarchy than a hierarchy in which a subject communication device of the two or more communication devices is provided, i) the data, ii) a MAC, and iii) an individual identifier of the communication device in the hierarchy that is one closer to the N-th hierarchy such that when the subject communication device is the communication device of the (N−1)-th hierarchy, a first receiving unit of the communication device of the (N−1)-th hierarchy receives, from the communication device of the N-th hierarchy, i) the data, ii) the MAC, and iii) the individual identifier of the communication device of the N-th hierarchy;
a second CPU that generates a MAC on the MAC received by the first receiving unit by performing the predetermined MAC generating function using i) the MAC received by the first receiving unit and ii) a secret key unique to the subject communication device such that when the subject communication device is the communication device of the (N−1)-th hierarchy, a second CPU of the communication device of the (N−1)-th hierarchy generates a MAC on the MAC generated by the communication device in the N-th hierarchy by performing the predetermined MAC generating function using i) the MAC from the communication device in the N-th hierarchy and ii) a secret key unique to the communication device of the (N−1)-th hierarchy; and
a second transmitting, unit that transmits i) the data, ii) the MAC generated by the second CPU, iii) an individual identifier of the subject communication device, and iv) the individual identifier of the communication device of in the hierarchy that is one closer to the N-th hierarchy received by, the first receiving unit, to 1) the data receiving device and 2) a communication device in a hierarchy that is one closer to the data receiving device than the subject communication device such that when the subject communication device is the communication device of the (N−1)-th hierarchy, a second transmitting unit of the communication device of the (N−1)-th hierarchy transmits i) the data, ii) the MAC generated by the second CPU of the communication device of the (N−1)-th hierarchy, iii) the individual identifier of the communication device of the (N−1)-th hierarchy, and iv) the individual identifier of the communication device of the N-th hierarchy received by the first receiving unit of the communication device of the (N−1)-th hierarchy, to the data receiving unit and a communication device in a (N−2)-th hierarchy, wherein the secret key unique to the subject communication device is a secret key derived by performing the pseudo-random function, and wherein the data receiving device comprises:

a memory that stores a destination device key as a secret key determined in advance;

a second receiving unit that receives, via the communication device in the first hierarchy, 1) the data, 2) a list of the individual identifier of the communication device of the N-th hierarchy and individual identifiers of the two or more communication device in the first hierarchy to the (N−1)-th hierarchy, and 3) the MAC generated by the communication device in the first hierarchy;

a third CPU that:

extracts, from the list received by the second receiving unit, an individual identifier of each of the communication devices from the first hierarchy to the N-th hierarchy in a transmission path of the data;

generates a secret key corresponding to the individual identifier of each of the communication device from the first hierarchy to the N-th hierarchy by 1) deriving a first secret key by performing a predetermined pseudo-random function using i) the destination device key and the extracted individual identifier of the communication device in the first hierarchy and 2) deriving of a k-th secret key is derived by performing the predetermined pseudo-random function using i) a (k−1)-th secret key derived using an individual identifier of a communication device in a (k−1)-th hierarchy and ii) an individual identifier of a communication device in a k-th hierarchy such that a secret key is derived by performing the predetermined pseudo-random function using i) the derived first secret key and i) the extracted individual identifier of the communication device of a second hierarchy, wherein k is a positive integer from 2 to N;

generates a MAC corresponding to each of the communication devices from the N-th hierarchy to the first hierarchy by performing a predetermined MAC generating function using i) the data received by the second receiving unit and ii) an N-th secret key corresponding to the extracted individual identifier of the communication device in the N-th hierarchy and 2) deriving an m-th MAC by performing the predetermined MAC generating function using i) a (m+1)-th MAC derived using an individual identifier of a communication device in a (m+1)-th hierarchy and ii) a secret key corresponding to an individual identifier of a communication device in an m-th hierarchy such that a (N−1)-th MAC is derived by performing the predetermined MAC generating function using i) the derived N-th MAC and ii) an (N−1)-th secret key corresponding to the extracted individual identifier of the communication device in the (N−1)-th hierarchy; wherein m is a positive integer from N−1 to 1; and compares the MAC received by the second receiving unit with the MAC corresponding to the first hierarchy communication device generated by the third CPU.

6. The data transmission system according to claim 5, wherein the third CPU further extracts the individual identifier of each of the communication devices in the first hierarchy to the N-th hierarchy in the transmission path from a hierarchical identifier of each of the communication devices as a distribution target of the secret key, wherein the hierarchical identifier is an identifier uniquely associated with each of the communication devices, the hierarchical identifier being comprised of a combination of 1) the individual identifier of the communication device associated with the hierarchical identifier, and 2) an individual identifier of each of one or more other communication devices in the transmission path, wherein the third CPU further generates a secret key of the communication device of the N-th hierarchy as a distribution target of the secret key by 1) deriving a first secret key of the communication device in the first hierarchy by performing the predetermined pseudo-random function using the destination device key and the extracted individual identifier of the communication device in the first hierarchy and 2) deriving a k-th secret key of a communication device in a k-th hierarchy by performing the predetermined pseudo-random function using i) a (k−1)-th secret key derived using an individual identifier of a communication device in a (k−1)-th hierarchy and ii) an individual identifier of a communication device in a k-th hierarchy such that a second secret key is derived by performing the predetermined pseudo-random function using i) the derived first secret key and ii) the extracted individual identifier of the communication device in the second hierarchy, wherein k is a positive integer from 2 to N, and wherein the secret key unique to the transmission source device and the secret key unique to each of the one or more repeater devices are one of the secret key generated by the third CPU and the secret key generated based on the secret key generated by the third CPU.

7. The data transmission system according to claim 6, wherein the first CPU generates the secret key unique to the transmission source device by performing the predetermined pseudo-random function using the secret key generated by the third CPU and a predetermined value, wherein the second CPU generates the secret key unique to each of the one or more repeater devices by performing the predetermined pseudo-random function using the secret key generated by the third CPU and the predetermined value, wherein, when the second receiving unit of the data receiving device receives the data, the list, and the generated by the communication device in the first hierarchy, the third CPU generates a true secret key corresponding to the individual identifier of each of the communication devices from the first hierarchy to the N-th hierarchy by 1) deriving a first true secret key by performing the predetermined pseudo-random function using the first secret key and the predetermined value and 2) deriving a k-th true secret key by performing the predetermined pseudo-random function using the k-th secret key and the predetermined value, wherein the third CPU uses the true secret key as the secret key corresponding to the extracted individual identifier, and wherein a value of the individual identifier is different from the predetermined value.

8. The data transmission system according to claim 6, wherein the second CPU:
   extracts the individual identifier of each of the communication devices in the first hierarchy to the N-th hierarchy, from the list of the individual identifiers, from a communication device located in a lower-order position than the subject communication device and regarded as a distribution target of the secret key to a communication device located in an immediately lower order position than the subject communication device; and
   generates a secret key of the lower-order communication device as the distribution target of the secret key by 1) deriving a first secret key of a first hierarchy communication device away from the subject communication device by performing the predetermined pseudo-random function using the secret key unique to the subject communication device and the extracted individual identifier of the communication device in the first hierarchy and 2) deriving a k-th secret key of a k-th hierarchy communication device away from the subject communication by performing the predetermined pseudo-random function using i) the derived (k−1)-th secret key and the extracted individual identifier of the k-th hierarchy communication device away from the subject communication device, and
   wherein the secret key unique to the lower-order communication device is one of the secret key generated by the second CPU and the secret key generated based on the secret key generated by the second CPU.

9. The data transmission system according to claim 5, wherein the first CPU generates a MAC on the MAC generated by the first CPU by performing the predetermined MAC generating function using the MAC on the data generated by the first CPU and the secret key unique to the transmission source device,
   wherein the first transmitting unit transmits, to the communication device in the (N−1)-th hierarchy, the data, two MACs generated by the first CPU, and the individual identifier of the transmission source device,
   wherein the second CPU:
   generates a secret key unique to a communication device that has performed the transmission to the subject communication device by performing the predetermined pseudo-random function using 1) the secret key unique to the subject communication device and 2) the individual identifier of the communication device that has performed the transmission to the to the subject communication device among the individual identifiers received by the first receiving unit;
   generates a MAC on a second MAC of the two MACs by performing the predetermined MAC generating function using 1) the second MAC of the two MACs received by the first receiving unit and 2) the secret key unique to the communication device that has performed the transmission to the subject communication device;
   generates a MAC on a first MAC of the two MACs by performing the predetermined MAC generating function using the first MAC and the secret key unique to the subject communication device; and
   compares the first MAC with the MAC on the second MAC, and
   wherein the second transmitting unit transmits to one of another communication device and the data receiving device the data, the first MAC, the MAC on the first MAC, and the individual identifier of the subject communication device and the individual identifier received by the first receiving unit.

10. The data transmission system according to claim 9, wherein the second transmitting unit of the repeater device performs the transmission, when the second CPU determines that the first MAC and the MAC on the second MAC agree with each other.

11. The data transmission system according to claim 10, wherein, when the second CPU determines that the first MAC and the MAC on the second MAC agree with each other, the second CPU generates a MAC on the first MAC by performing the predetermined MAC generating function using the first MAC and the secret key unique to the repeater device.

12. The data transmission system according to claim 5,
   wherein the first CPU generates a MAC on the data and encrypts the data by performing, a predetermined authentication encryption function using the data and the secret key unique to the transmission source device,
   wherein the first transmitting unit of the transmission source device transmits the encrypted data, the MAC generated by the first CPU, and the individual identifier of the transmission source device to the communication device in the (N−1)-th hierarchy,
   wherein the first receiving unit of the subject communication device receives the encrypted data, the MAC, and the individual identifier of the communication device in the hierarchy that is one closer to the N-th hierarchy than the hierarchy in which the subject communication device is located,
   wherein the second transmitting unit of the subject communication device transmits, to one of another communication device and the data receiving device, the encrypted data, the MAC generated by the second CPU, the MAC generated by the transmission source device, the individual identifier of the subject communication device, and the individual identifier received by the first receiving unit,
   wherein the second receiving unit of the data receiving device receives the encrypted data, the list, the MAC generated by the repeater device, and the MAC generated by the transmission source device, via the communication device in the first hierarchy,
   wherein the third CPU:
   decrypts the encrypted data to generate the data by performing a predetermined authentication decryption function with the secret key corresponding to the extracted individual identifier of the N-th hierarchy communication device, the encrypted data received by the second receiving unit, and the MAC generated by the transmission source device,
   generates a MAC corresponding to each of the communication devices from the (N−1)-th hierarchy to the first hierarchy by performing the predetermined MAC generating function using the MAC generated by the transmission source device and received by the second receiving unit, and the secret key corresponding to the extracted individual identifier of the (N−1)-th hierarchy communication device and by performing the predetermined MAC generating function using the derived (m+1)-th MAC and the secret key corresponding to the extracted individual identifier of the m-th hierarchy communication device, wherein m is a positive integer from N−2 to 1, and compares the MAC generated by the repeater device and received by the second receiving unit with the MAC corresponding to the first hierarchy communication device generated by the third CPU.

13. A key generating device comprising:
a memory that stores a destination device key as a secret key determined in advance; and
a central processing unit (CPU) that:
extracts an individual identifier of each communication device of communication devices respectively located in a first hierarchy to an N-th hierarchy in a transmission path from a hierarchical identifier as a distribution target of the secret key, wherein the hierarchical identifier is an identifier uniquely associated with each of the communication devices, and wherein the hierarchical identifier is comprised of a combination of 1) the individual identifier of the communication device associated with the hierarchical identifier and 2) the individual identifier of each of one or more other communication devices in the transmission path; and
generates a secret key of the communication device of the N-th hierarchy as a distribution target of the secret key by 1) deriving a first secret key by performing a predetermined pseudo-random function using the destination device key and the extracted individual identifier of the communication device in the first hierarchy and 2) deriving of a k-th secret key is derived by performing the predetermined pseudo-random function using i) a (k−1)-th secret key derived using an individual identifier of a communication device in a (k−1)-th hierarchy and ii) individual identifier of a communication device in a k-th hierarchy such that a second secret key is derived by performing the predetermined pseudo-random function using i) the derived first secret key and ii) the extracted individual identifier of the communication device of the second hierarchy, wherein k is a positive integer from 2 to N.

* * * * *